(12) United States Patent
Wang et al.

(10) Patent No.: US 11,475,800 B2
(45) Date of Patent: Oct. 18, 2022

(54) METHOD OF DISPLAYING PRICE TAG INFORMATION, APPARATUS, AND SHELF SYSTEM

(71) Applicant: BOE TECHNOLOGY GROUP CO., LTD., Beijing (CN)

(72) Inventors: Xiaohong Wang, Beijing (CN); Shu Wang, Beijing (CN); Xin Li, Beijing (CN); Xinxin Yang, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 211 days.

(21) Appl. No.: 16/768,392

(22) PCT Filed: Mar. 21, 2019

(86) PCT No.: PCT/CN2019/079095
§ 371 (c)(1),
(2) Date: May 29, 2020

(87) PCT Pub. No.: WO2020/186520
PCT Pub. Date: Sep. 24, 2020

(65) Prior Publication Data
US 2021/0366315 A1 Nov. 25, 2021

(51) Int. Cl.
*G09F 3/20* (2006.01)
*G06T 7/70* (2017.01)
(Continued)

(52) U.S. Cl.
CPC .......... *G09F 3/208* (2013.01); *G06K 9/6256* (2013.01); *G06T 7/70* (2017.01); *G06V 20/20* (2022.01); *G09F 9/37* (2013.01)

(58) Field of Classification Search
None
See application file for complete search history.

(56) References Cited

U.S. PATENT DOCUMENTS 5,537,312 A    7/1996  Sekiguchi et al.
6,243,690 B1   6/2001  Adamec et al.
(Continued)

FOREIGN PATENT DOCUMENTS

CN    107133543 A    9/2017
CN    109308434 A    2/2019
(Continued)

OTHER PUBLICATIONS

International search report of PCT application No. PCT/CN2019/079095 dated Dec. 26, 2019.

*Primary Examiner* — Leon Viet Q Nguyen
(74) *Attorney, Agent, or Firm* — Fay Sharpe LLP

(57) ABSTRACT

Provided is a method of displaying price tag information applied to a price tag generating apparatus in a shelf system which includes a shelf and at least one display screen arranged on the shelf. The method includes: acquiring an image of a commodity placed on the shelf; determining price tag related information based on the image of the commodity, wherein the price tag related information comprises price tag information of the commodity; and sending the price tag related information to a target display screen, which is a display screen for displaying the price tag information in the at least one display screen, and the price tag related information being configured to allow the target display screen to display the price tag information.

19 Claims, 14 Drawing Sheets

(51) Int. Cl.
    *G06K 9/62*           (2022.01)
    *G09F 9/37*           (2006.01)
    *G06V 20/20*         (2022.01)

(56) References Cited

U.S. PATENT DOCUMENTS

| | | | |
|---|---|---|---|
| 2013/0325533 A1 | 12/2013 | Shin | |
| 2018/0166046 A1* | 6/2018 | Yamazaki | G06F 3/1431 |
| 2020/0093288 A1 | 3/2020 | Sun et al. | |
| 2020/0311659 A1* | 10/2020 | Yonezawa | G06Q 30/06 |
| 2020/0334620 A1* | 10/2020 | Yanagi | G06Q 30/06 |
| 2021/0398096 A1* | 12/2021 | Tan | G06Q 20/203 |

FOREIGN PATENT DOCUMENTS

| | | |
|---|---|---|
| CN | 109330284 A | 2/2019 |
| CN | 109409218 A | 3/2019 |

\* cited by examiner

METHOD OF DISPLAYING PRICE TAG INFORMATION, APPARATUS, AND SHELF SYSTEM

CROSS-REFERENCE TO RELATED APPLICATION

The present application is a national phase application based on PCT/CN2019/079095, filed on Mar. 21, 2019, which is incorporated herein by reference in its entirety.

TECHNICAL FIELD

The present disclosure relates to the field of electronic technology applications, and more particularly to a method of displaying price tag information, an apparatus, and a shelf system.

BACKGROUND

At present, in supermarkets, an electronic price tag may be correspondingly placed in each commodity placement region of a shelf. The electronic price tag is an electronic ink screen for displaying price tag information. Workers in the supermarkets may manually and regularly set the price tag information in the electronic price tag.

SUMMARY

Embodiments of the present disclosure provide a method of displaying price tag information, an apparatus, and a shelf system. The technical solutions are as follows:

According to a first aspect of the embodiments of the present disclosure, a method of displaying price tag information is provided. The method is applied to a price tag generating apparatus in a shelf system, and the shelf system further includes a shelf and at least one display screen arranged on the shelf. The method includes:

acquiring an image of a commodity placed on the shelf;

determining price tag related information based on the image of the commodity, wherein the price tag related information includes price tag information of the commodity placed on the shelf; and sending the price tag related information to a target display screen, wherein the target display screen is a display screen for displaying the price tag information in the at least one display screen, and the price tag related information is configured to allow the target display screen to display the price tag information.

Optionally, the determining the price tag related information based on the image of the commodity includes:

recognizing the image of the commodity to obtain an identifier of the commodity placed on the shelf; and determining the price tag information of the commodity based on the identifier of the commodity.

Optionally, the recognizing the image of the commodity to obtain the identifier of the commodity placed on the shelf includes:

inputting the image of the commodity to an image recognition model, and obtaining the commodity identifier output from the image recognition model, the image recognition model being configured to recognize the input image to obtain the identifier of the commodity in the image.

Optionally, prior to inputting the image of the commodity to the image recognition model, the method further includes:

acquiring an initial image recognition model; and training the initial image recognition model by using images of a plurality of commodities and identifiers of the plurality of commodities as training samples to obtain the image recognition model.

Optionally, the image of the commodity includes images of the commodity captured at a plurality of directions.

Optionally, the image recognition model is a Region with CNN feature (RCNN) model or a Single Shot MultiBox Detector (SSD) model.

Optionally, the determining the price tag information of the commodity based on the identifier of the commodity includes:

querying a corresponding relationship between identifiers of commodities and information of the commodities based on the identifier of the commodity to obtain commodity information of the commodity; and generating the price tag information of the commodity based on the commodity information of the commodity.

Optionally, the price tag related information further includes display position information for indicating a display position of the price tag information on the target display screen, the image of the commodity further includes an image of a shelf where the commodity is placed, and the determining the price tag related information based on the image of the commodity includes:

recognizing the image of the commodity to obtain a position of the commodity on the shelf;

determining the target display screen based on the position of the commodity on the shelf and a position of the at least one display screen on the shelf; and determining the display position information based on the position of the commodity on the shelf and a position of the target display screen on the shelf.

Optionally, the shelf includes a shelf body and at least one placement board, at least one display screen is arranged at a front end of each placement board; and the determining the target display screen based on the position of the commodity on the shelf and the position of the at least one display screen on the shelf includes:

determining display screens located on the same placement board as the commodity based on the position of the commodity on the shelf and the position of the at least one display screen on the shelf; and determining a display screen, having an intersection with the arrangement range of the commodity in the length direction of the placement board where the commodity is placed, as the target display screen from the display screens located on the same placement board as the commodity.

Optionally, the shelf includes a shelf body and at least one placement board, at least one display screen is arranged at a front end of each placement board, the target display screen and the commodity are arranged on the same placement board, and the determining the display position information based on the position of the commodity on the shelf and the position of the target display screen on the shelf includes:

determining an overlapping range between an arrangement range of the commodity and an arrangement range of the target display screen in a length direction of the placement board where the commodity is placed, based on the position of the commodity on the shelf and the position of the target display screen on the shelf; and determining the display position information, the display position information indicating a position within the overlapping range.

Optionally, a linear coordinate system is established along the length direction of the placement board where the commodity is placed, the display position information includes a length of the price tag information in the linear coordinate system, and a starting coordinate for displaying the price tag information in the linear coordinate system; and the determining the display position information, the display position information indicating a position within the overlapping range includes:

determining the display position information based on a position calculation formula when the overlapping range is within the arrangement range of the target display screen, wherein the position calculation formula is:

$$L=Xm+(X-K)/2,$$

wherein L is the starting coordinate for displaying the price tag information in the linear coordinate system, $Xm \leq L < Xn$, Xm is a starting coordinate of the overlapping range in the linear coordinate system, Xn is an ending coordinate of the overlapping range in the linear coordinate system, K is the length of the price tag information in the linear coordinate system, and X is a length of the overlapping range in the linear coordinate system.

Optionally, the method further includes:

updating the price tag related information when an update condition is met; and sending the updated price tag related information to the target display screen.

Optionally, the update condition includes at least one of the followings:

a price tag update instruction for updating the price tag related information is received;

a distance between a position indicated by first display position information and a position indicated by second display position information is greater than a position distance threshold, wherein the first display position information is display position information in price tag related information determined based on a re-acquired image of the commodity, and the second display position information is display position information in historical price tag related information determined at a previous time point closest to a time point of the price tag related information determined based on the re-acquired image of the commodity; or first price tag information is different from second price tag information, wherein the first price tag information is price tag information in price tag related information determined based on a re-acquired image of the commodity, and the second price tag information is price tag information in historical price tag related information determined at a previous time point closest to a time point of the price tag related information determined based on the re-acquired image of the commodity.

Optionally, the method further includes:

sending reminder information to a target terminal when the image of the commodity meets a reminder triggering condition, wherein the reminder triggering condition includes at least one of the followings:

a certain commodity is vacant on the shelf;

a number of a certain commodity on the shelf is less than a number threshold; or a certain commodity on the shelf is placed in a wrong position.

According to a second aspect of the embodiments of the present disclosure, a price tag generating apparatus is provided, wherein a shelf system to which the price tag generating apparatus belongs further includes a shelf and at least one display screen arranged on the shelf, and the price tag generating apparatus includes:

an acquiring module, configured to acquire an image of a commodity placed on the shelf;

a determining module, configured to determine price tag related information based on the image of the commodity, wherein the price tag related information includes price tag information of the commodity placed on the shelf; and a first sending module, configured to send the price tag related information to a target display screen, wherein the target display screen is a display screen for displaying the price tag information in the at least one display screen, and the price tag related information is configured to allow the target display screen to display the price tag information.

Optionally, the price tag related information further includes display position information for indicating a display position of the price tag information on the target display screen, the image of the commodity further includes an image of a shelf where the commodity is placed, and the determining module includes:

a position recognizing sub-module, configured to recognize the image of the commodity to obtain a position of the commodity on the shelf;

a first determining sub-module, configured to determine the target display screen based on the position of the commodity on the shelf and a position of the at least one display screen on the shelf; and a second determining sub-module, configured to determine the display position information based on the position of the commodity on the shelf and a position of the target display screen on the shelf.

Optionally, the shelf includes a shelf body and at least one placement board, at least one display screen is arranged at a front end of each placement board, the target display screen and the commodity are arranged on the same placement board, and the second determining sub-module is configured to:

determine an overlapping range between an arrangement range of the commodity and an arrangement range of the target display screen in a length direction of the placement board where the commodity is placed based on the position of the commodity on the shelf and the position of the target display screen on the shelf; and determine the display position information, the display position information indicating a position within the overlapping range.

Optionally, a linear coordinate system is established along the length direction of the placement board where the commodity is placed, the display position information includes a length of the price tag information in the linear coordinate system, and a starting coordinate for displaying the price tag information in the linear coordinate system, and the second determining sub-module is configured to:

determine the display position information based on a position calculation formula when the overlapping range is within the arrangement range of the target display screen, wherein the position calculation formula is:

$$L=Xm+(X-K)/2,$$

wherein L is the starting coordinate for displaying the price tag information in the linear coordinate system, $Xm \leq L < Xn$, Xm is a starting coordinate of the overlapping range in the linear coordinate system, Xn is an ending coordinate of the overlapping range in the linear coordinate system, K is the length of the price tag information in the linear coordinate system, and X is a length of the overlapping range in the linear coordinate system.

Optionally, the shelf includes a shelf body and at least one placement board, wherein at least one display screen is arranged at a front end of each placement board; and the first determining sub-module is configured to:

determine display screens located on the same placement board as the commodity based on the position of the commodity on the shelf and the position of the at least one display screen on the shelf; and determine a display screen, having an intersection with the arrangement range of the commodity in the length direction of the placement board where the commodity is placed, as the target display screen from the display screens located on the same placement board as the commodity.

Optionally, the determining module includes:

an identifier recognizing sub-module configured to recognize the image of the commodity to obtain an identifier of the commodity placed on the shelf; and a third determining sub-module configured to determine the price tag information of the commodity based on the identifier of the commodity.

Optionally, the identifier recognizing sub-module is configured to:

input the image of the commodity to an image recognition model, and obtain the commodity identifier output from the image recognition model, wherein the image recognition model is configured to recognize the input image to obtain the identifier of the commodity in the image.

Optionally, the apparatus further includes:

a model acquiring module configured to acquire an initial image recognition model prior to the image of the commodity is input, to the image recognition model; and a training module configured to train the initial image recognition model by using images of a plurality of commodities and identifiers of the plurality of commodities as training samples to obtain the image recognition model.

Optionally, the image of the commodity includes images of the commodity captured at a plurality of directions.

Optionally, the image recognition model is an RCNN model or an SSD model.

Optionally, the determining module is configured to:

query a corresponding relationship between identifiers of commodities and information of the commodities based on the identifier of the commodity to obtain commodity information of the commodity; and generate the price tag information of the commodity based on the commodity information of the commodity.

Optionally, the price tag generating apparatus further includes:

an updating module configured to update the price tag related information when an update condition is met; and a second sending module configured to send the updated price tag related information to the target display screen.

Optionally, the update condition includes at least one of the followings:

a price tag update instruction for updating the price tag related information is received;

a distance between a position indicated by first display position information and a position indicated by second display position information is greater than a position distance threshold, wherein the first display position information is display position information in price tag related information determined based on a re-acquired image of the commodity, and the second display position information is display position information in historical price tag related information determined at a previous time point closest to a time point of the price tag related information determined based on the re-acquired image of the commodity; or first price tag information is different from second price tag information, wherein the first price tag information is price tag information in price tag related information determined based on a re-acquired image of the commodity, and the second price tag information is price tag information in historical price tag related information determined at a previous time point closest to a time point of the price tag related information determined based on the re-acquired image of the commodity.

Optionally, the price tag generating apparatus further includes:

a third sending module configured to send reminder information to a target terminal when the image of the commodity meets a reminder triggering condition, wherein the reminder triggering condition includes at least one of the followings:

a certain commodity is vacant on the shelf;

a number of a certain commodity on the shelf is less than a number threshold;

or, a certain commodity on the shelf is placed in a wrong position.

According to a third aspect of the embodiments of the present disclosure, a price tag generating apparatus is provided, including:

a processor; and a memory configured to store instructions executable by the processor, wherein the processor can implement any one of the methods of displaying price tag information in the first aspect when executing the executable instructions.

According to a fourth aspect of the embodiments of the present disclosure, a shelf system is provided, including:

a price tag generating apparatus, a shelf and at least one display screen arranged on the shelf, wherein the price tag generating apparatus includes any one of the price tag generating apparatus in the second and third aspects.

Optionally, the system further includes image acquiring apparatuses.

The shelf includes a shelf body and a plurality of placement boards, at least one of the display screens is arranged at a front end of each of the placement boards, and an image acquiring apparatus is arranged above each of the plurality of placement boards, and is configured to capture an image of the placement board below the image acquiring apparatus.

Optionally, a plurality of display screens are arranged at the front end of each of the placement boards, the display screen is a bar-shaped display screen, the image acquiring apparatus is a camera head, and a lens of each camera head faces downwards.

According to a fifth aspect of the embodiments of the present disclosure, a computer-readable storage medium is provided, wherein instructions are stored in the computer-readable storage medium, and when the readable storage medium is run on a processing component, the processing component is caused to execute any one of the methods of displaying price tag information in the first aspect.

According to a sixth aspect of the embodiments of the present disclosure, a computer program product is provided, wherein instructions are stored in the computer program product, and when the computer program product is run on a computer, the computer is caused to execute any one of the methods of displaying price tag information in the first aspect.

According to a seventh aspect of the embodiments of the present disclosure, a chip is provided. The chip includes a programmable logic circuit and/or a program instruction.

When being run, the chip can implement any one of the methods of displaying price tag information in the first aspect.

It is to be understood that both the foregoing general description and the following detailed description are exemplary only and are not intended to limit the present disclosure.

BRIEF DESCRIPTION OF THE DRAWINGS

In order to describe the embodiments of the present disclosure more clearly, a brief introduction on the accompanying drawings required for describing the embodiments is made in the following. Apparently, the accompanying drawings as described below merely show some of the embodiments of the present disclosure, and a person of ordinary skill in the art may also derive other drawings from these accompanying drawings without paying creative efforts.

The accompanying drawings, which are incorporated in and constitute a part of this specification, illustrate embodiments consistent with the present disclosure and, together with the specification, serve to explain the principles of the present disclosure.

DETAILED DESCRIPTION

For presenting the objects and principles of the present disclosure more clearly, the present disclosure is further described in detail below in combination with the accompanying drawings. Apparently, the described embodiments are merely some embodiments, rather than all embodiments, of the present disclosure. Based on the embodiments of the present disclosure, all other embodiments derived by a person of ordinary skill in the art without creative efforts shall fall within the protection scope of the present disclosure.

Figure 1:
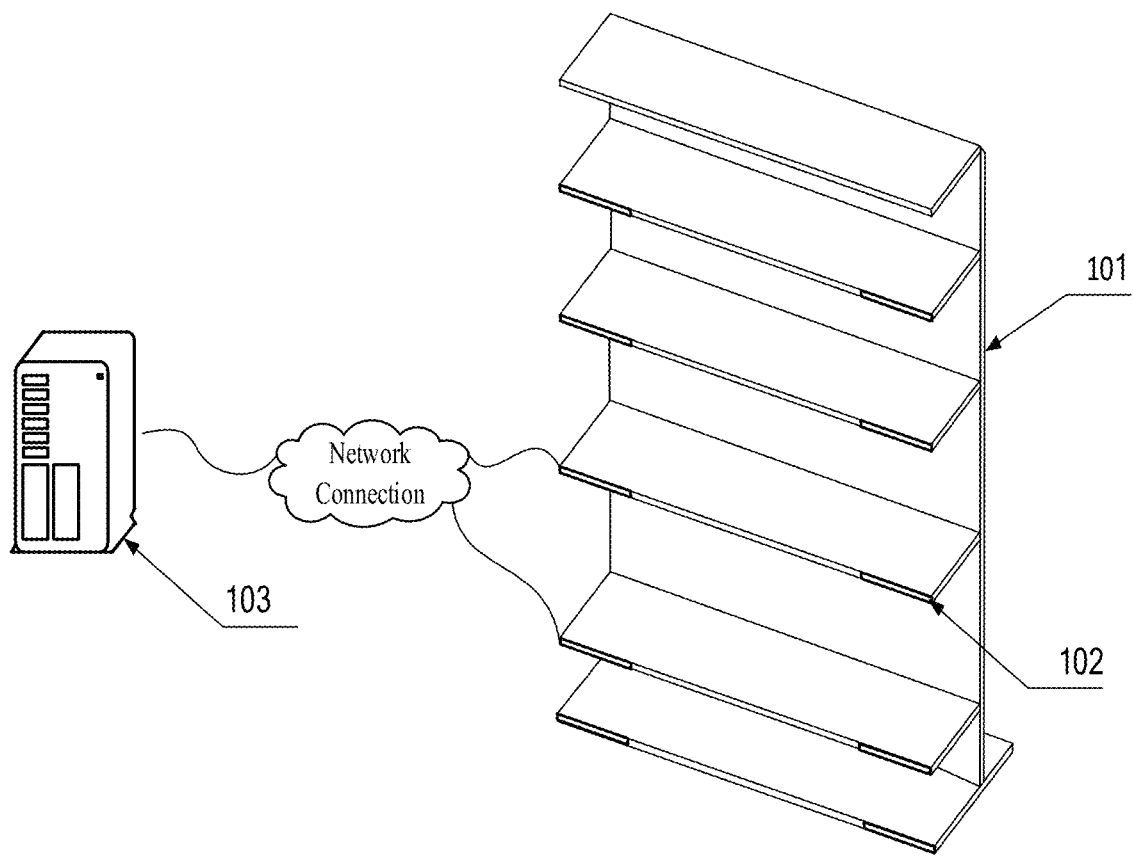
FIG. 1 is a schematic diagram of a shelf system involved in a method of displaying price tag information provided by an embodiment of the present disclosure.

FIG. 1 is a schematic diagram of a shelf system involved in a method of displaying price tag information provided by an embodiment of the present disclosure. The shelf system can be deployed at commodity selling places such as shopping malls or supermarkets. The shelf system may include: a shelf 101, at least one display screen 102 arranged on the shelf 101, and a price tag generating apparatus 103.

Figure 2:
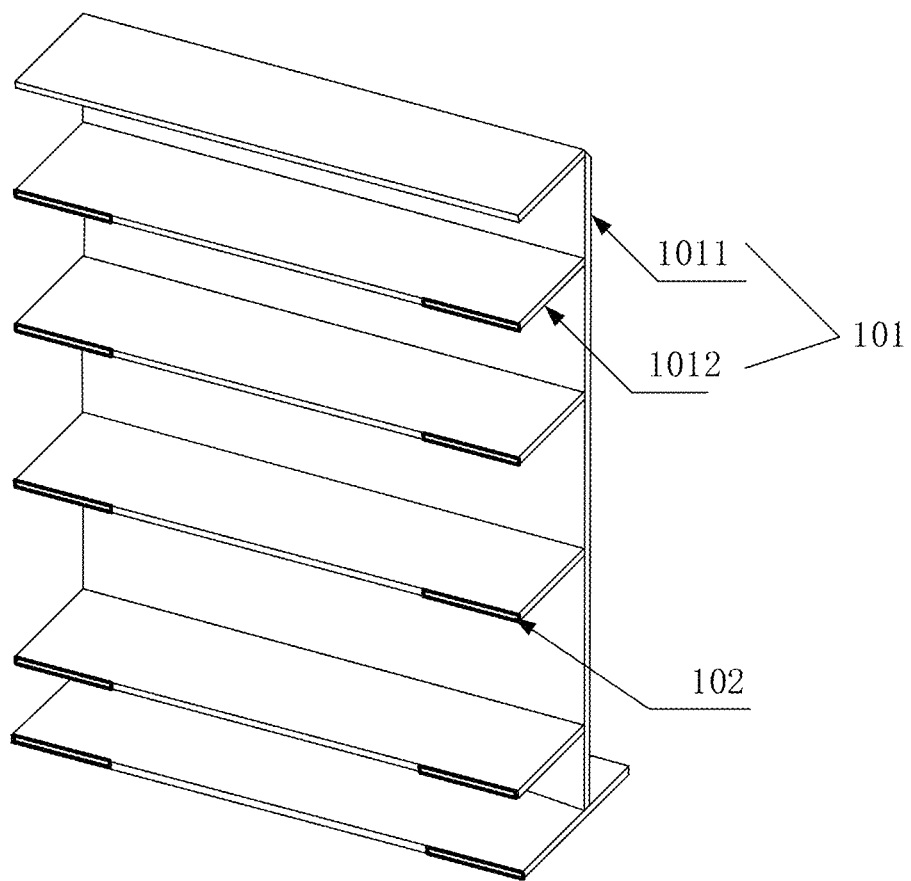
FIG. 2 is a schematic structural diagram of a shelf provided by an embodiment of the present disclosure.
Figure 3:
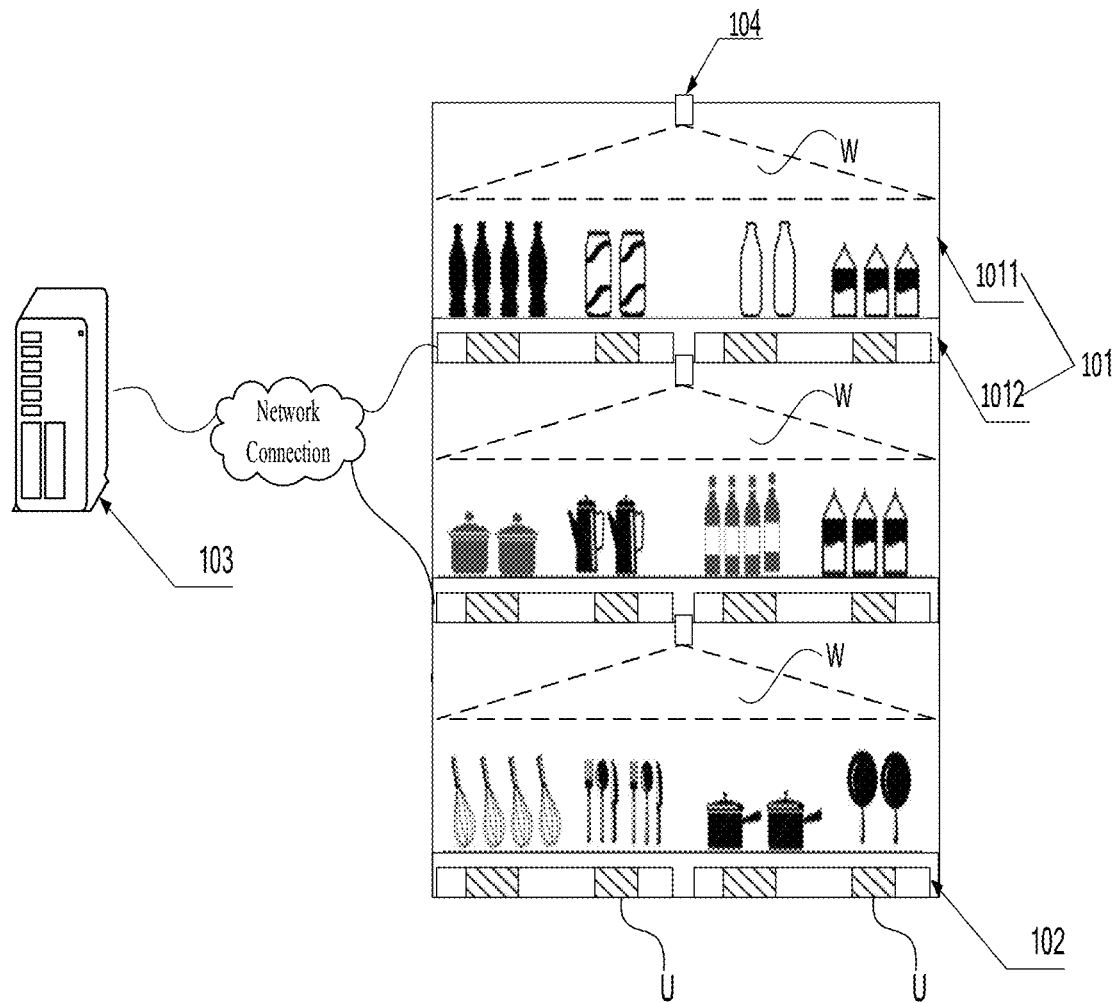
FIG. 3 is a schematic diagram of another shelf system involved in a method of displaying price tag information provided by an embodiment of the present disclosure.

Exemplarily, as shown in FIG. 2 and FIG. 3, FIG. 2 is a schematic structural diagram of a shelf provided by an embodiment of the present disclosure; and FIG. 3 is a schematic diagram of another shelf system including the shelf provided by an embodiment of the present disclosure. The shelf 101 includes a shelf body 1011 and a plurality of placement boards 1012. The placement boards are generally arranged in an array along the height direction of the shelf body, and are configured to accommodate commodities. Exemplarily, the upper surface of the placement board can carry a commodity or a commodity can be hung up to the lower surface of the placement board. At least one (i.e., one or more) display screen 102 is arranged at the front end of each placement board 1012. Exemplarily, the display screen is a rectangular display screen (such as a bar-shaped display screen) or a special-shaped display screen (such as a circular display screen or an oval display screen). Generally, bar-shaped display screens are disposed on shelves because on the one hand, the bar-shaped display screen and the front end of the placement board fit in shape, and on the other hand, as there is much content in the price tag information, a bar-shaped display screen can ensure the display of all the content of price tag information. Further, as a carrier of the price tag information, a bar-shaped display screen is more flexible and easy to control. At least one piece of price tag information U is displayed on each display screen, and is configured to mark a commodity placed on the corresponding placement board. The corresponding relationship between price tag information displayed on the display screens and the placement boards is preset. In one example, the above-mentioned corresponding placement board may refer to a placement board where the display screen showing the price tag information is located. That is, the price tag information is configured to mark the commodity placed on the placement board where the display screen is located. In another example, the above-mentioned corresponding placement board may refer to an adjacent placement board below the placement board where the display screen showing the price tag information is located. That is, the price tag information is configured to mark a commodity placed on the adjacent placement board below the placement board where the display screen is located.

It should be noted that the front end of the placement board may also be referred to as the front face of the placement board. When the shelf is placed at a commodity selling place, the front end of the placement board faces customers, so that the customers can see commodities placed on the placement board. A worker can place the commodities on the placement board through the front end of the placement board.

FIG. 2 is only a schematic structure of a shelf. When the embodiment of the present disclosure is actually implemented, the structures of the shelf may be various. For example, the shelf body in FIG. 2 is of a platy structure, and in practice, may be of a hollow structure composed of multiple support rods. In another example, the shelf may further include a top plate which is arranged above the topmost placement board in the plurality of placement boards and which is used to shield dust. The top plate may also be regarded as an idle placement board. The embodiment of the present disclosure does not limit the structure of the shelf.

In the shelf system, the price tag generating apparatus may be a server, or a server cluster composed of a plurality of servers, or a cloud computing service center. A wired or wireless network connection is established between the price tag generating apparatus and the display screens, so that the price tag generating apparatus communicates with the display screens through the network connection. Exemplarily, the wired network connection may include a Transmission Control Protocol/Internet Protocol (TCP/IP) network connection, a fiber optic network connection, or an InfiniBand (IB) network connection. The wireless network connection includes: a Wireless Fidelity (WIFI) network connection, $3^{rd}$-generation (3G) mobile communication technology network connection, a General Packet Radio Service (GPRS) network connection, or the like. It is worth noting that the network connection in the shelf system may also be a network connection of a dedicated transmission network, so that the privacy in data transmission can be ensured, and a risk of data leakage can be reduced.

The price tag generating apparatus 103 is configured to determine price tag related information to be displayed by a display screen based on an image of a commodity. Further, the price tag generating apparatus can also integrate functions such as commodity recognition, shelf management, user analysis and the like. For example, the price tag generating apparatus may record the sales of commodities in different time periods and/or sales of commodities by different people groups (such as mother and baby commodities or men's commodities); and the recorded data can be used for user analysis. It should be noted that an image of a commodity refers to an image at least including the commodity. The image may also include an image of other articles.

Optionally, the price tag generating apparatus 103 may receive the image of the commodity sent by an image acquiring apparatus. In one implementation, the image acquiring apparatus may be an apparatus outside the shelf system, for example, may be an apparatus with an image shooting function such as a video camera, a mobile phone, a tablet PC (pad), or the like. The worker may use the apparatus to shoot an image of a commodity, and transmit the image to the price tag generating apparatus. In another implementation, the image acquiring apparatus may be an apparatus inside the shelf system. That is, the shelf system includes the image acquiring apparatus. Referring to FIG. 3 again, the shelf system in FIG. 3 may include: image acquiring apparatuses 104 each of which may be a camera head, a video camera, a camera, or the like. For example, the image acquiring apparatus 104 may be a Charge Coupled Device (CCD) camera.

The image acquiring apparatus 104 is arranged above each of the plurality of placement boards 1012, and is configured to collect an image of the placement board below the image acquiring apparatus 104. That is, the image acquiring apparatuses are in a one-to-one correspondence with the placement boards; and each image acquiring apparatus captures the image of the corresponding placement board. An image collection range W of the image acquiring apparatus covers an area of the upper surface of the corresponding placement board. The image acquiring apparatus may be installed above the corresponding placement board in various ways. For example, the image acquiring apparatus may be fixed on a mounting frame, and/or installed on other structure of a shelf above the corresponding placement board.

Exemplarily, in FIG. 3, it is assumed that the image acquiring apparatus 104 is a camera head. For each of the non-bottom placement boards in the plurality of placement boards, a camera head having the lens facing downwards (for shooting an image of the upper surface of a placement board below the non-bottom placement board) is arranged on the lower surface of the non-bottom placement board. For the topmost placement board in the plurality of placement boards, a camera head having the lens facing downwards (for shooting an image of the upper surface of the topmost placement board) is arranged above the topmost placement board through a mounting frame (not shown in FIG. 3). Each camera head can shoot an image of a commodity placed on the placement board below the camera head. That is, each camera head can capture an image of a face of the commodity facing the lens side of the camera.

In a traditional supermarket, the price tag information on display screens on the shelves needs to be manually set, resulting in low setting efficiency.

Figure 4:
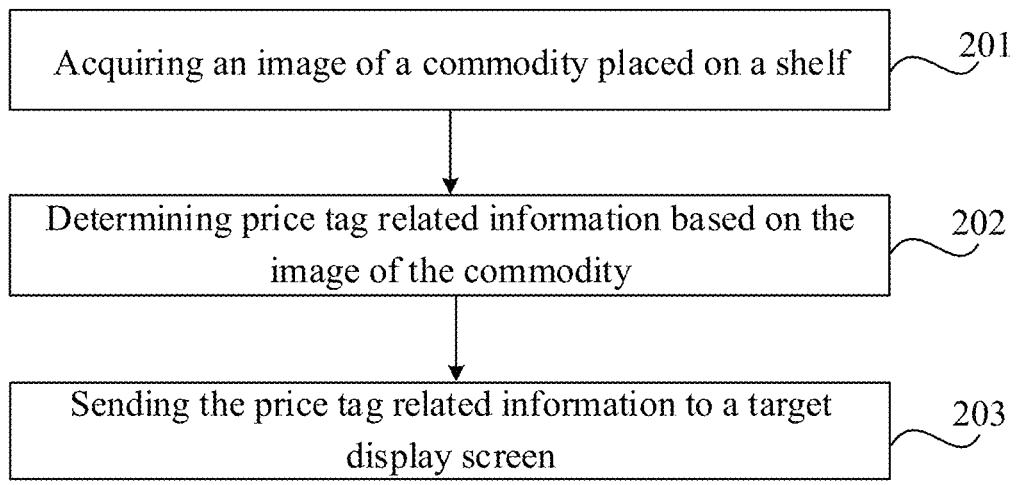
FIG. 4 is a schematic flowchart of a method of displaying price tag information provided by an embodiment of the present disclosure.

FIG. 4 is a schematic flowchart of a method of displaying price tag information provided by an embodiment of the present disclosure. Through the method, price tag information on a display screen can be automatically set, so that the setting efficiency is improved. The method may be applied to a shelf system, for example, may be executed by a price tag generating apparatus which may be the apparatus as shown in FIG. 1 or FIG. 3. The shelf system further includes a shelf and at least one display screen arranged on the shelf. The method includes the following steps.

In step 201, an image of a commodity placed on the shelf is acquired.

In step 202, price tag related information is determined based on the image of the commodity.

The price tag related information includes price tag information of the commodity placed on the shelf.

In step 203, the price tag related information is sent to a target display screen.

The target display screen is a display screen for displaying the price tag information in the at least one display screen, and the price tag related information is configured to allow the target display screen to display the price tag information.

In summary, in the method of displaying price tag information provided by the embodiment of the present disclosure, the price tag generating apparatus may determine the price tag related information including the price tag information based on the acquired image of the commodity, and send the price tag related information to the target display screen to allow the target display screen to display the price tag information, so that the automatic generation and display of the price tag information can be achieved without an involvement of a worker, thereby improving the use flexibility and setting efficiency of the price tag information.

Figure 5:
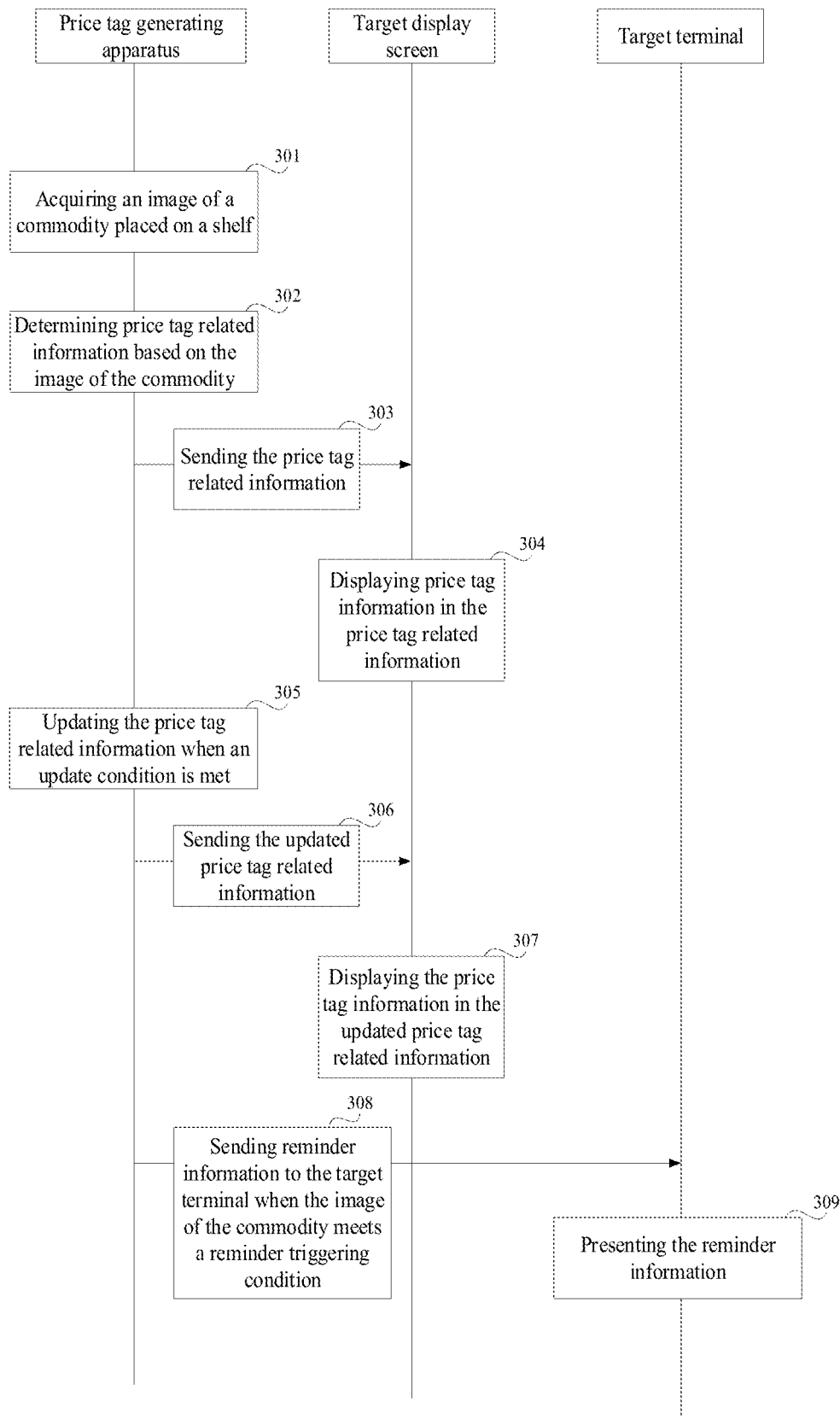
FIG. 5 is a schematic flowchart of another method of displaying price tag information provided by an embodiment of the present disclosure.

FIG. 5 is a schematic flowchart of a method of displaying price tag information provided by an embodiment of the present disclosure. Through the method, price tag information on the display screen can be automatically set, so that setting efficiency is improved. The method is applied to a price tag generating apparatus in a shelf system. The price tag generating apparatus may be the apparatus shown in FIG. 1 or FIG. 3. The shelf system further includes a shelf and at least one display screen arranged on the shelf. The method includes the following steps.

In step 301, an image of a commodity placed on the shelf is acquired by the price tag generating apparatus.

In the embodiment of the present disclosure, in response to the initiation of the normal function of the display screen on the shelf, the price tag generating apparatus can be triggered to acquire an image. In an implementation, the display screen sends an acquiring request to the price tag generating apparatus. In another implementation, a worker controls the price tag generating apparatus through a terminal or a control button to acquire the image.

The price tag generating apparatus may receive an image sent by the image acquiring apparatus. There are multiple types of image acquiring apparatuses. Correspondingly, there are multiple manners for the price tag generating apparatus to acquire the image. The embodiment of the present disclosure is described by taking the following implementation manners as examples.

In a first manner, the shelf system includes the image acquiring apparatus. The image acquiring apparatus is arranged near the shelf to ensure that the image can be shot. In an implementation manner, the image acquiring apparatus can be arranged at a position directly facing the front end of each shelf, for example, may be arranged on a wall or shelf opposite to each shelf. In this way, the image acquiring apparatus can shoot a whole image of the front end of the shelf. The shot image is relatively square, less in deformation, and has a lower complexity in the subsequent image processing. In another implementation, the image acquiring apparatus may be arranged at a position diagonally opposite to the front end of each shelf, and for example, may be arranged at a corner of a room where the shelf is located. In this way, the image acquiring apparatus can shoot a whole image of the front end of the shelf. The shot image needs image correction in the subsequent image processing as it has some degree of distortion. In yet another implementation, as shown in FIG. 3, the image acquiring apparatuses are arranged above each of the plurality of placement boards. In this way, each image acquiring apparatus can shoot an image of a commodity placed on a placement board below the image acquiring apparatus. The granularity of the acquired images is finer, and blocking among commodities is less, facilitating effective recognition of commodity in the image in the subsequent image processing.

Exemplarily, the above image acquiring apparatus is a camera head, a video camera, a camera, or the like.

In a second manner, the image acquiring apparatus may be an apparatus outside the shelf system, for example, may be an apparatus with an image shooting function such as a video camera, a mobile phone, a tablet PC, or the like. A worker may use the apparatus to shoot an image, and transmit the image to the price tag generating apparatus. In this way, the worker can take pictures for a targeted shelf where the setting of price tag information is required, so that the flexibility of the acquired image is improved.

After acquiring the image, the price tag generating apparatus may first detect commodity in the acquired image. The detecting process includes: judging whether there is any commodity in the acquired image; if yes, determining that the image is a commodity image; or if not, determining that the image is an invalid image, and as such, the price tag generating apparatus may acquire an image again, or perform an another operation.

It is worth noting that in some conditions, it is a default setting that the image acquired by the price tag generating apparatus includes a commodity. That is, the acquired image is necessarily a commodity image. Thus, there is no need to perform the above commodity detecting process. For example, in the second manner, the acquired image is an image collected by the worker, and thus it can be determined by default that the image acquired is a commodity image.

In step 302, the price tag generating apparatus determines price tag related information based on the image of the commodity.

Figure 6:
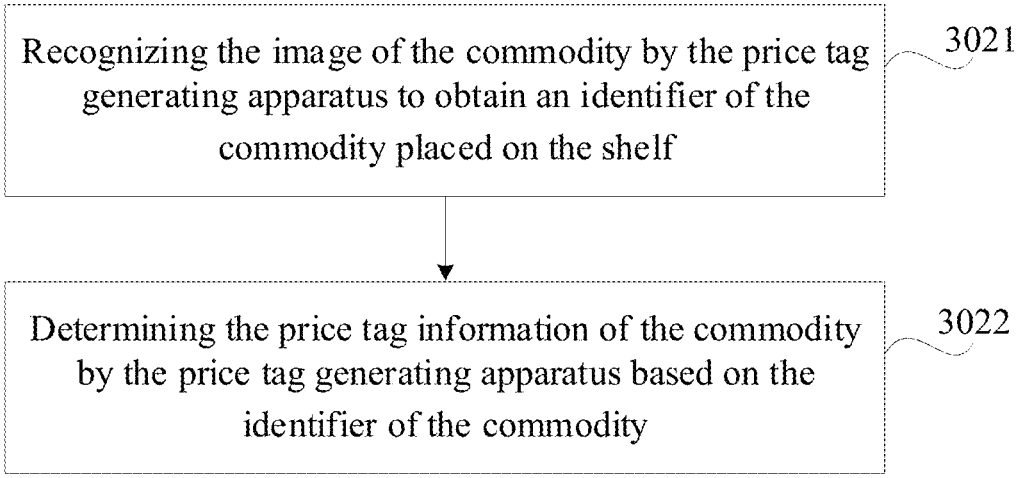
FIG. 6 is a schematic flowchart of determining, by a price tag generating apparatus, price tag related information based on an image of a commodity provided by an embodiment of the present disclosure.

In a first possible implementation, the price tag related information includes the price tag information of the commodity placed on the shelf. Referring to FIG. 6 which is a schematic flowchart of determining the price tag related information by the price tag generating apparatus based on the image of the commodity provided by an embodiment of the present disclosure, step 302 includes the following sub-steps.

In step 3021, the price tag generating apparatus recognizes the image of the commodity to obtain an identifier of the commodity placed on the shelf.

The identifier of the commodity is configured to mark the commodity, and may be a marker for indicating the commodity, such as the name, the QR code, the serial number, the attribute information (including the category, color and/or shape of the commodity) of the commodity, or the like. In one example, the identifier of the commodity is text information in the image of the commodity; and the price tag generating apparatus may determine the identifier of the commodity through a text recognition algorithm. For example, the price tag generating apparatus may identify an area where the identifier is located in the image of the commodity as acquired, and then process the area where the identifier is located in the image of the commodity, so that the identifier of the commodity can be extracted through processing like correction, cropping, and text extraction on the area. In another example, the price tag generating apparatus may recognize the image based on an image recognition algorithm to obtain the identifier of the commodity. For example, the price tag generating apparatus may determine information such as the position and size (also called dimension) of the commodity based on the image of the commodity. An image calibration can be then performed and may include: determining positions of feature points in the image according to the information such as the position and the size of the commodity, and calibrating the position of the commodity in the image; and cropping (or segmenting) the image of the commodity post calibration of position to obtain the feature image of an area containing the commodity (generally the minimum enclosing rectangle area of the commodity in the image). The above feature points are points where inherent features of the commodity locate. For example, if the commodity is a beverage, the feature point of the beverage may include a bottle cap, a bottle neck, an outer packaging of a bottle body, and the like. Finally, a commodity recognition is performed and may include: determining the identifier of the commodity in the feature image. Exemplarily, the commodity recognition process may include the following steps.

Step X1 includes a feature value extraction process, wherein a feature value is obtained by calculation according to the feature image. The feature value is configured to reflect a feature of the feature image itself, and may be a vector or an array. In an optional manner, the calculation process of the feature value may be implemented by a convolutional neural network (CNN). For example, an image to be identified may be directly input to the CNN, and the CNN calculates and outputs the feature value. In another optional manner, the calculation process of the feature value may be implemented by other calculation module or feature extractor. For example, the calculation process of the feature value may include: performing at least one convolution operation on the feature image, and using the result as the feature value. Of course, there may also be other manners for extracting the feature value, which are not limited in the embodiment of the present disclosure.

Step X2 includes a feature value comparison process, wherein the extracted feature value is compared to the pre-stored feature values. If a feature value matching the extracted feature value exists, a commodity identifier corresponding to the matched feature value is determined as the identifier of the extracted feature value, namely, the identifier of the commodity. Exemplarily, the existence of the feature value matching the extracted feature value means that when compared with the extracted feature value, there is a feature value having a similarity greater than a threshold. For example, the similarity threshold may be 80%.

It should be noted that the pre-stored feature values refer to feature values stored in the price tag generating apparatus or a storage device connected to the price tag generating apparatus before the feature value comparison process.

In the embodiment of the present disclosure, the above recognition process may be implemented by a pre-established image recognition model. Exemplarily, the price tag generating apparatus may acquire the image recognition model in advance, wherein the image recognition model is configured to recognize the input image to obtain the identifier of the commodity in the image. For example, the image recognition model may execute the above steps X1 and X2 to recognize the image. Then, the price tag generating apparatus inputs the image of the commodity into the image recognition model, and obtain the commodity identifier output by the image recognition model.

In an exemplary implementation, the price tag generating apparatus may establish the image recognition model, wherein the establishing process may include the following steps.

In step Y1, the price tag generating apparatus acquires an initial image recognition model.

Exemplarily, the initial image recognition model may be a Region with CNN feature (RCNN) model or an Single Shot MultiBox Detector (SSD) model.

In step Y2, the price tag generating apparatus trains the initial image recognition model by using images of a plurality of commodities and identifiers of the plurality of commodities as training samples to obtain the image recognition model.

Exemplarily, a worker can select multiple commodities from a commodity selling place where the shelf system is deployed, shoot a commodity image for each commodity, and obtain an identifier of each commodity. The shot images and the acquired identifiers are used as training samples to train the initial image recognition model.

For example, when the initial image recognition model is the RCNN model, the initial image recognition model may be trained at least once based on a loss function until a loss value of the loss function converges to a target range. At this time, the obtained initial image recognition model after the training is determined as the image recognition model.

Of course, the finally obtained image recognition model after the training is of the same type as the initial image recognition model, and is the RCNN model or SSD model.

Optionally, the images of the commodity in the training sample include the images of the commodity captured from one or more directions, for example, may include images of each commodity captured from one or more perspectives. When the image of each commodity includes the images of the commodity captured at a plurality of directions, the training samples may be abundant and training results can be more accurate. As such, the finally obtained image recognition model can effectively recognize the commodity placed on the shelf in different poses, reducing the risk of misrecognition. Exemplarily, the image of each commodity may include at least two selected from a group consisting of a top view, a left view, a right view, a front view, a rear view, and a bottom view of the commodity.

In another exemplary embodiment, the price tag generating apparatus may acquire an image recognition model provided by another apparatus. The image recognition model may be established through training by other apparatus. The establishing process may be similar to the above steps Y1 and Y2, or may be other establishing processes, which is not limited in the embodiment of the present disclosure.

In step 3022, the price tag generating apparatus determines price tag information of the commodity based on the identifier of the commodity.

Optionally, in step 3022, the price tag generating apparatus may execute the following steps.

In step Z1, the price tag generating apparatus queries a corresponding relationship between identifiers of commodities and information of the commodities based on the identifier of the commodity to obtain commodity information of the commodity.

The price tag generating apparatus may store the corresponding relationship between the identifiers of the commodities and the information of the commodities. The corresponding relationship is established based on identifiers of the commodities and information of the commodities at a commodity selling place where a price tag display system is deployed, and is updated along with the update of the commodities at the commodity selling place. The price tag generating apparatus may query the corresponding relationship based on the acquired commodity identifier to obtain the commodity information of the commodity. The commodity information is attribute information of the commodity, and for example, it may at least include the name (also referred to as trade name) and price, may further include at least one selected from the group consisting of the origin, material, color, grade, specification, unit, log number, package version and discount. For different commodities, the corresponding relationship may have different attribute information included in the commodity information.

For example, if an identifier of a commodity is the name of the commodity: "Cola", by querying the corresponding relationship between the identifiers of the commodities and the information of the commodities, the commodity information obtained may include: Name: Cola; Price: 2 yuan; Origin: Mainland China; Specification: 500 ml; Unit: 1 bottle; and Log No.: 10006045.

In another example, if an identifier of a commodity is the name of the commodity: "Aluminum Pan", by querying the corresponding relationship between the identifiers of commodities and the information of commodities, the commodity information obtained may include: Name: Aluminum Pan; Price: 100 yuan; Origin: Mainland China; Specification: 18 cm; Color: Red; and Log No.: 10006011.

In step Z2, the price tag generating apparatus generates price tag information of the commodity based on the commodity information of the commodity.

The price tag information of the commodity is also configured to mark the commodity, and present the commodity information in the form of a price tag. The price tag generating apparatus may adjust the commodity information in a set arranging, filling and/or rendering manner to generate the price tag information. The price tag information at least includes content of the commodity information.

Figure 7:
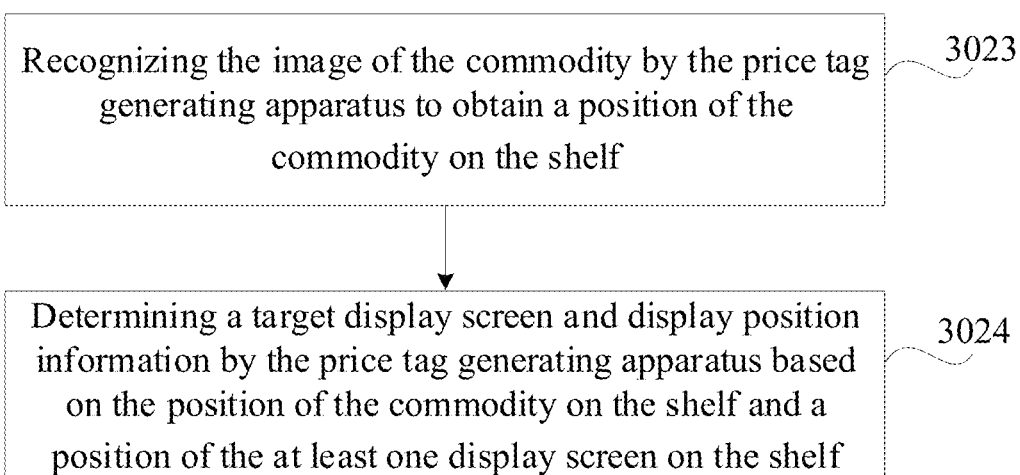
FIG. 7 is a schematic flowchart of determining, by another price tag generating apparatus, the price tag related information based on the image of the commodity provided by an embodiment of the present disclosure.

In a second implementation, the price tag related information further includes display position information for indicating a display position of the price tag information on the display screen. The image of the commodity further includes an image of the shelf. Further, as shown in FIG. 7, the process of determining the price tag related information based on the image of the commodity includes a process of determining the display position information, which includes the following steps.

In step 3023, the price tag generating apparatus recognizes the image of the commodity to obtain a position of the commodity on the shelf.

In step 3023, for the recognition process of the commodity image by the price tag generating apparatus, reference may be made to partial process in the above step 3021; or the two steps may be executed simultaneously. For example, in another example of the above step 3021, the price tag generating apparatus needs to detect the commodity. This process includes: determining the information such as the position and size (also referred to as dimension) of the commodity based on the image of the commodity. By detecting the commodity, the position of the commodity on the shelf can be determined. Of course, the price tag generating apparatus may use other preset position detection algorithms to recognize the image to detect the position of the commodity on the shelf.

In step 3024, the price tag generating apparatus determines a target display screen and display position information based on the position of the commodity on the shelf and a position of the at least one display screen on the shelf.

Optionally, as one or more display screens are mounted on the shelf, the price tag generating apparatus needs to determine the display screen on which the generated price tag information is to be displayed as well as the display position of the generated price tag information on the display screen. Thus, step 3024 may include the following steps.

In step W1, the target display screen is determined based on the position of the commodity on the shelf and the position of the at least one display screen on the shelf.

It can be known from the foregoing that the shelf includes a shelf body and at least one placement board, and at least one display screen is arranged at the front end of each placement board. In different conditions, corresponding relationships between the price tag information displayed on the display screens and the placement boards may be different. The embodiment of the present disclosure is described by taking the following two optional implementations as examples.

In a first optional implementation, the price tag information is configured to mark the commodity placed on the placement board where the display screen is located. That is, in step W1, based on the position of the commodity on the shelf and the position of the at least one display screen on the shelf, a display screen(s) located on the same placement board as the commodity is/are determined. In the display screen(s) located on the same placement board as the commodity, a display screen having an intersection with the arrangement range of the commodity in the length direction of the same placement board (the length direction is the length direction of the front end of the placement board) is determined as the target display screen. Exemplarily, the orthographic projection of the arrangement range of the commodity onto the length direction (the orthographic projection is actually a line segment) can be compared with the orthographic projection of each display screen on the same placement board onto the length direction (the orthographic projection is actually a line segment), when the orthographic projection of a certain display screen has an intersection with the orthographic projection of the arrangement range, it means that the display screen has an intersection with the arrangement range of the commodity, and the display screen is determined as the target display screen.

Figure 8:
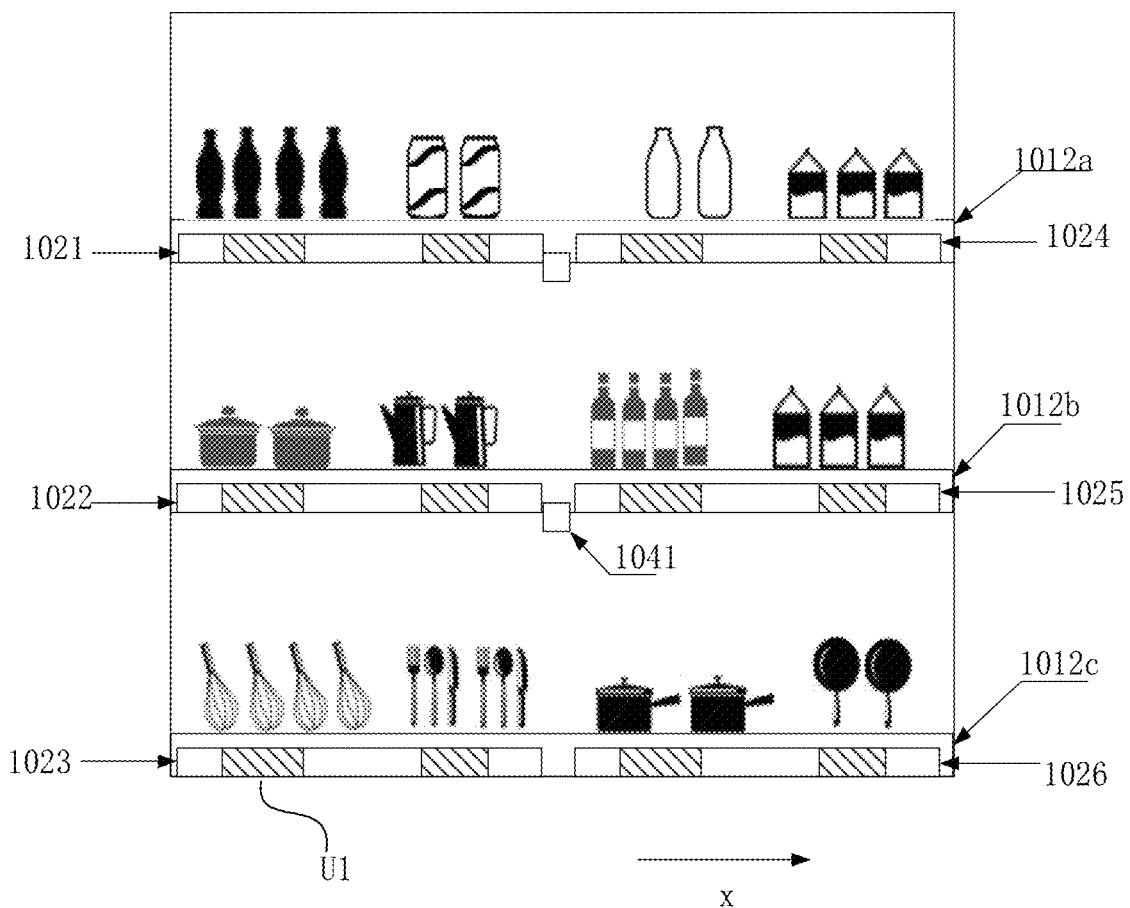
FIG. 8 is a schematic diagram of a partial structure of a shelf according to an embodiment of the present disclosure.

Referring to FIG. 8, which is a schematic diagram of a partial structure of a shelf, it is assumed that there are three placement boards on the shelf, namely, the placement boards 1012a to 1012c, respectively. Two bar-shaped display screens are placed on each placement board. The display screens on the shelf are display screens 1021 to 1026, respectively. Based on the images of the commodities shot by camera heads 1041, the commodities identified by the price tag generating apparatus include eggbeaters arranged on the shelf 1012c. As the display screen 1023 has an intersection with the arrangement range of the eggbeaters in the length direction x of the placement board 1012c, it is determined that the display screen 1023 is the target display screen. Subsequently, the price tag information U1 of the eggbeater is displayed on the display screen 1023.

In a second optional implementation, the price tag information is configured to mark a commodity placed on an adjacent placement board below the placement board where the display screens are located. That is, in step W1, based on the position of the commodity on the shelf and the position of the at least one display screen on the shelf, display screen(s) on the adjacent placement board above the placement board where the commodity is placed is/are determined. In the display screen(s) on the adjacent placement board above the placement board where the commodity is placed, a display screen having an intersection with the arrangement range of the commodity in the length direction of the placement board is determined as the target display screen.

Figure 9:
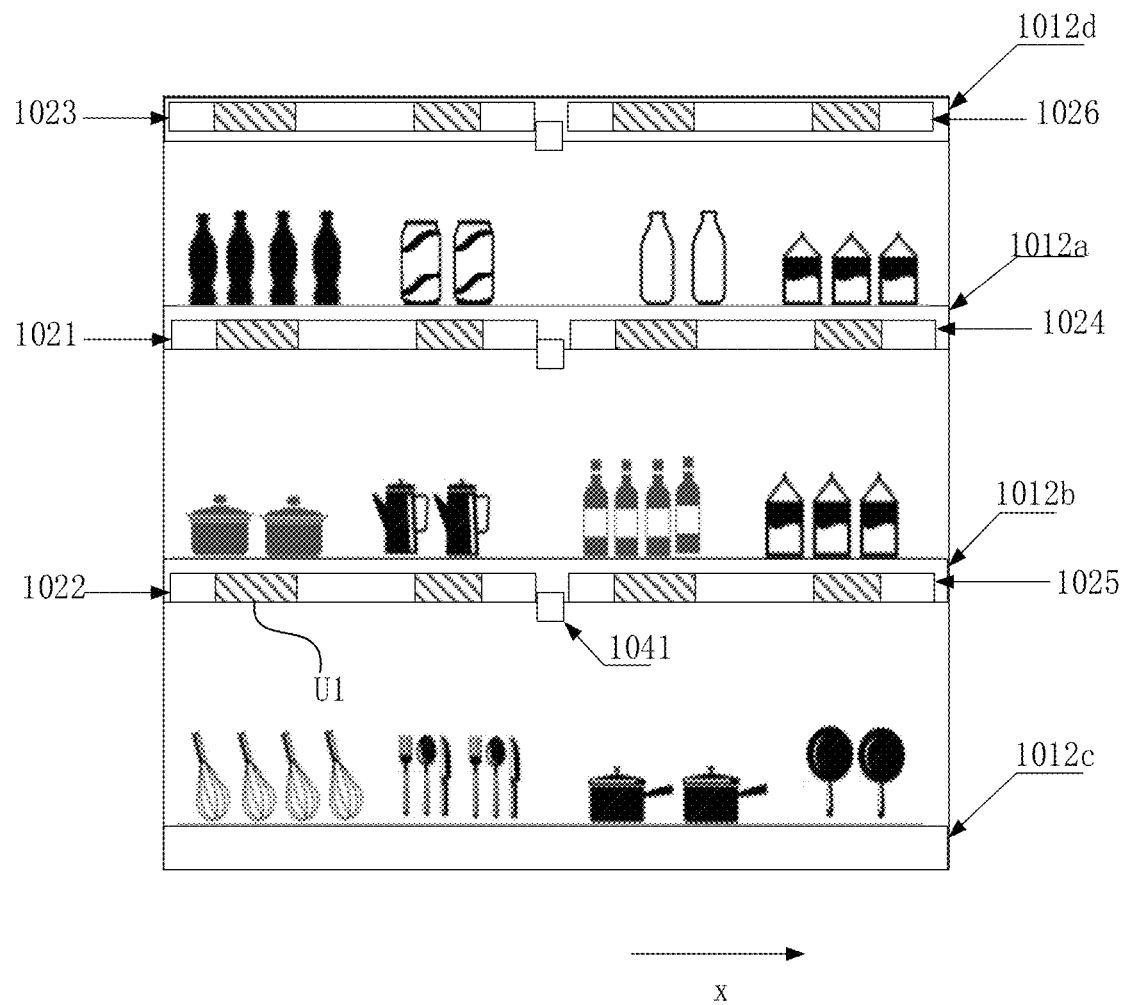
FIG. 9 is a schematic diagram of a partial structure of another shelf according to an embodiment of the present disclosure.

Referring to FIG. 9, which is a schematic diagram of a partial structure of another shelf, it is assumed that there are four placement boards on the shelf, namely, the placement boards 1012a to 1012d, respectively. The topmost placement board can be regarded as an idle placement board or the top board as no commodity is placed thereon. Two bar-shaped display screens are placed on each of non-bottom placement boards (namely, the placement boards which are not bottommost placement board). The display screens on the shelf are the display screens 1021 to 1026, respectively. Based on the images of the commodities shot by camera heads 1041, the commodities identified by the price tag generating apparatus include eggbeaters arranged on the shelf 1012*c*. The adjacent placement board above the placement board 1012*c* is the placement board 1012*b*. As the display screen 1022 has an intersection with an arrangement range of the eggbeaters in the length direction x of the placement board 1012*b*, it is determined that the display screen 1022 is the target display screen. Subsequently, the price tag information U1 of the eggbeaters is displayed on the display screen 1022.

It should be noted that the above two optional implementations may also be combined according to actual situations. For example, in the shelf system, a part of the price tag information may be configured to mark the commodity placed on the placement board where the display screen is located; while the other part of the price tag information may be configured to mark the commodity placed on the adjacent placement board below the placement board where the display screen is located. Details thereof are not repeated in the present disclosure.

In step W2, the display position information is determined based on the position of the commodity on the shelf and the position of the target display screen on the shelf.

In the first optional implementation in step W1, the shelf includes the shelf body and the at least one placement board; at least one display screen is arranged at the front end of each placement board; and the target display screen and the commodity are arranged on the same placement board. In this case, step W2 may include the following steps.

In step W21, an overlapping range between an arrangement range of the commodity and an arrangement range of the target display screen in a length direction of the placement board where the commodity is placed is determined based on the position of the commodity on the shelf and the position of the target display screen on the shelf.

In step W22, the display position information is determined, wherein the display position information indicating a position within the overlapping range.

The determined position within the overlapping range enables the commodity and the price tag information displayed on the display screen to be basically aligned in the length direction of the placement board. After seeing the price tag information on the display screen, a customer can clearly determine the commodity indicated by the price tag information.

In the embodiment of the present disclosure, for the convenience of calculation, with respect to each placement board, a linear coordinate system can be established along the length direction of the placement board. The display position information is determined based on the linear coordinate system. The origin of the linear coordinate system may be the leftmost end (such as on the upper left corner or the lower left corner), the rightmost end (such as on the upper right corner or the lower right corner), or the midpoint of the long side of the placement board.

Optionally, the linear coordinate system can be established along the length direction of the placement board where the commodity is placed. The display position information includes a length of the price tag information in the linear coordinate system, and a starting coordinate for displaying the price tag information in the linear coordinate system. Step W22 may include the following step.

The display position information is determined based on a position calculation formula when the overlapping range is within the arrangement range of the target display screen, wherein the position calculation formula is:

$$L = Xm + (X-K)/2.$$

Figure 10:
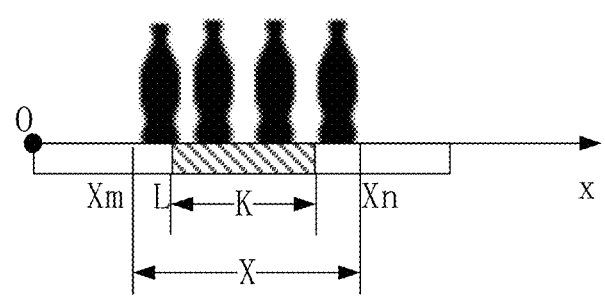
FIG. 10 is a schematic diagram of a process for determining display position information provided by an embodiment of the present disclosure.

Referring to FIG. 10, which is a schematic diagram of a process for determining display position information, L is the starting coordinate for displaying the price tag information in the linear coordinate system; $Xm \leq L < Xn$; Xm is a starting coordinate of the overlapping range in the linear coordinate system; Xn is an ending coordinate of the overlapping range in the linear coordinate system; K is the length of the price tag information in the linear coordinate system; and X is a length of the overlapping range in the linear coordinate system. In FIG. 10, it is assumed that the origin O of the linear coordinate system is the leftmost end of the long side of the placement board where the commodity is placed. In the actual implementation of the embodiments of the present disclosure, the origin of the linear coordinate system may also be the rightmost end or the midpoint of the long side of the placement board where the commodity is placed, or may be other designated positions, which is not limited in the present disclosure.

By using the position calculation formula, it can be ensured that the tag information is displayed at the center of the overlapping area in the target display screen, thereby ensuring the user experience of the customer.

It is worth noting that the above starting coordinate L for displaying the price tag information in the linear coordinate system may also be determined in other ways. For example, the starting coordinate L may be the leftmost end, rightmost end or midpoint of the overlapping area, or other designated points.

In another implementation, the display position information includes a starting coordinate and an ending display coordinate of the displayed price tag information in the linear coordinate system. A manner for determining the starting coordinate may refer to the above manner. The ending display coordinate may be calculated based on the length of the price tag information in the linear coordinate system and the starting coordinate for displaying the price tag information in the linear coordinate system. For example, the ending display coordinate is the sum of the starting coordinate and the length.

In the second optional implementation of step W1, the shelf includes a shelf body and at least one placement board; at least one display screen is arranged at the front end of each placement board; and the target display screen and the commodity are arranged on adjacent placement boards. As the length directions of the all placement boards are the same, the process of step W2 may be similar to the above steps W21 and W22. Details thereof are not repeated in the embodiment of the present disclosure.

In the shelf system, a display screen identifier can be assigned to each display screen to uniquely mark the display screen. After the price tag generating apparatus generates the price tag related information, the price tag related information may be stored in a tuple manner. Exemplarily, the price tag related information may be stored as (display screen identifier, price tag information, display position information). If the display screen identifier of the target display screen is 10001, the price tag information is "Name: Cola; Price: 2 yuan", and the display position information is "L+K", then, the price tag related information may be stored as (10001, "Name: Cola; Price: 2 yuan", "L+K").

In step 303, the price tag generating apparatus sends the price tag related information to the target display screen.

The target display screen is the display screen for displaying the price tag information in the at least one display screen; and the price tag related information is configured to allow the target display screen to display the price tag information.

Optionally, the price tag generating apparatus may send the price tag related information to the target display screen in a push manner.

In step 304, the target display screen displays the price tag information in the price tag related information.

After receiving the price tag related information, the target display screen displays the price tag information. When the price tag related information does not include the display position information, the target display screen may display the price tag information in a preset manner. For example, the price tag information may be displayed on the left, on the right or in the center of the target display screen.

When the price tag related information includes the display position information, the target display screen displays the price tag information at the position indicated by the display position information.

Figure 11:
FIG. 11 is a schematic diagram of a display interface of price tag information provided by an embodiment of the present disclosure.

As described in step 3022, the price tag information may contain the content of the commodity information, which may at least include the name (also referred to as trade name) and price, may further include at least one selected from the group consisting of the origin, material, color, grade, specification, unit, log number, package version and discount. As shown in FIG. 11 which is a schematic diagram of a display interface of price tag information, the price tag information of Cola is taken as an example in this figure, and it is assumed that the price tag information includes the name, price, origin, specification, unit and log number, wherein the name is Cola, the price is 2 yuan, the origin is mainland China, the specification is 500 ml, the unit is 1 bottle, and the log number is 10006045. For different commodities, the content and display layout of the price tag information may be different, which is not limited in the embodiment of the present disclosure.

It is worth noting that when the display screen is bar-shaped, as it is long, in the length direction of the placement board, the display screen may cover the arrangement ranges of a plurality of commodities. Thus, price tag information of the plurality of commodities may be displayed on one display screen. The quantity of price tag information displayed on one display screen is not limited in the present disclosure.

When the embodiment of the present disclosure is actually implemented, there may also be free areas in the display screen in addition to the area where the price tag information has been displayed. Target content items, such as advertisements, videos or dynamic images, may be displayed in the free areas. Thus, on the one hand, a utilization ratio of the display screen can be increased, and on the other hand, the content displayed on the display screen can be enriched.

In step 305, the price tag generating apparatus updates the price tag related information when an update condition is met.

The update condition may include at least one of the followings.

In a first condition, a price tag update instruction for updating the price tag related information is received.

For example, a worker may trigger the price tag update instruction when the price tag information is needed to be updated; and the price tag generating apparatus updates the price tag related information when receiving the price tag update instruction. Exemplarily, the worker may send the price tag update instruction to the price tag generating apparatus through a designated terminal, or may trigger the price tag update instruction through an input/output interface of the price tag generating apparatus or a hardware button. In this way, the worker may targetedly trigger the price tag generating apparatus to update the price tag information when the price tag information is needed to be updated, thereby improving the flexibility in updating the price tag information.

In a second condition, a distance between a position indicated by first display position information and a position indicated by second display position information is greater than a position distance threshold, wherein the first display position information is display position information in price tag related information determined based on a re-acquired image of a commodity; and the second display position information is display position information in historical price tag related information determined at a previous time point closest to a time point of the price tag related information determined based on the re-acquired image of the commodity.

When the distance between the positions of the same commodity in the two consecutively acquired images is large, it means that the position of the price tag information does not correspond to the commodity any longer. Thus, it is necessary to update the price tag related information to ensure the accuracy of the display position of the price tag information. In this way, the display position of the price tag information of the commodity can be intelligently adjusted as the change in the position of the commodity on the shelf, further improving the displaying flexibility of the price tag information.

Figure 12:
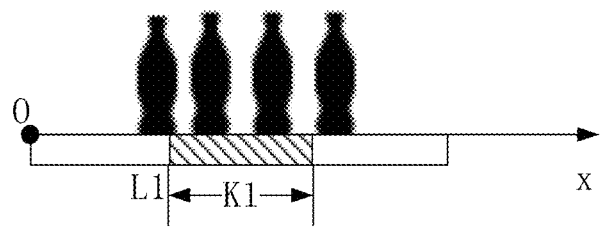
FIG. 12 is a schematic diagram of a change process of two consecutively acquired images of a commodity provided by an embodiment of the present disclosure.
Figure 12:
Figure 12:
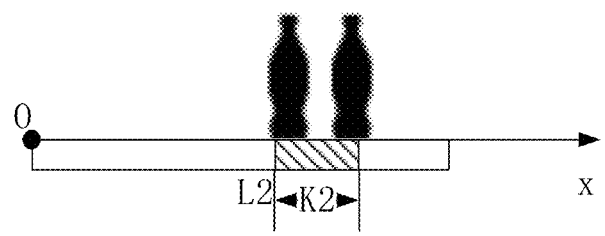

As shown in FIG. 12, the second display position information includes a length K1 of the historical price tag information in the linear coordinate system, and a starting coordinate L1 for displaying the historical price tag information in the linear coordinate system. The first display position information includes a length K2 of the price tag information in the linear coordinate system, and a starting coordinate L2 for displaying the price tag information in the linear coordinate system. Whether the distance between the position indicated by the first display position information and the position indicated by the second display position information is greater than the position distance threshold can be determined by comparing the starting coordinates for displaying the price tag information of both the first display position information and the second display position information and/or the lengths of the price tag information of both the first display position information and the second display position information. For example, when the absolute value of the difference between K2 and K1 is greater than a first difference threshold, it is determined that the distance between the position indicated by the first display position information and the position indicated by the second display position information is greater than the position difference threshold; and/or, when the absolute value of the difference between L1 and L2 is greater than a second difference threshold, it is determined that the distance between the position indicated by the first display position information and the position indicated by the second display position information is greater than the position distance threshold.

In a third condition, the first price tag information is different from the second price tag information. The first price tag information is price tag information in the price tag related information determined based on a re-acquired image of the commodity; and the second price tag information is price tag information in the historical price tag related information determined at a previous time point closest to a time point of the price tag related information determined based on the re-acquired image of the commodity.

When contents of the price tag information of the same commodity in the two consecutively acquired images are different, the price tag related information can be updated to ensure the accurate display of the price tag information.

It should be noted that the above update conditions are only illustrative, there may be other update conditions when the embodiment of the present disclosure is actually implemented. For example, the above price tag related information may be periodically updated. The price tag generating apparatus will update the price tag related information each time the current time reaches an update cycle. In this case, the update condition is that the current time reaches the update cycle.

In step 306, the price tag generating apparatus sends the updated price tag related information to the target display screen.

Optionally, the price tag generating apparatus may send the updated price tag related information to the target display screen in a push manner.

In step 307, the target display screen displays the price tag information in the updated price tag related information.

In the embodiment of the present disclosure, the price tag generating apparatus may also automatically update the price tag information, so that the use flexibility and the setting efficiency of the price tag information are further improved.

In step 308, the price tag generating apparatus sends reminder information to a target terminal when the image of the commodity meets a reminder triggering condition.

The reminder triggering condition includes at least one of the followings.

In a first reminder triggering condition, a certain commodity is vacant on the shelf.

In a second reminder triggering condition, the number of a certain commodity on the shelf is less than a number threshold.

In a third reminder triggering condition, a certain commodity on the shelf is placed in a wrong position.

Generally, the located area of every commodity on the shelf is fixed. The corresponding relationship between commodity identifiers and commodity subareas may be set in the price tag generating apparatus. As such, the price tag generating apparatus may detect commodity information of commodities in each commodity subarea based on the corresponding relationship and the image of the commodity. When the number of the commodities in a certain commodity subarea in the image of commodity is 0, the image of commodity meets the first reminder triggering condition. When the number of the commodities in the commodity subarea in the image of commodity is less than the number threshold, the image of the commodity meets the second reminder triggering condition. In an image of a commodity, when the identifier of commodity in the commodity subarea is not the commodity identifier recorded in the corresponding relationship, the image of commodity meets the third reminder triggering condition.

Exemplarily, the target terminal may be a mobile phone, a wearable device, or a computer. Under the above first and second reminder triggering conditions, the reminder information may be configured to remind the worker of replenishing commodities, so that the worker holding the target terminal can replenish the commodities on the shelf in time according to the reminder information. Under the third reminder triggering condition, the reminder information may be configured to remind the worker of the wrong position of a commodity, so that the worker holding the target terminal may adjust the position of the commodity on the shelf in time according to the reminder information.

The price tag generating apparatus may remind the worker through the target terminal by sending the reminder information under the reminder triggering conditions, so that the functions of the shelf system are further enriched, thereby ensuring efficient operation of the shelf system, and improving operational efficiency of the commodity selling places such as shopping malls or supermarkets.

It should be noted that the above reminder conditions are only illustrative, there may be other reminder conditions when the embodiment of the present disclosure is actually implemented. For example, the reminder condition may be set by the worker, so that the worker can easily know dynamics of the shelf and can timely regulate the selling situation of the commodity.

In step 309, the target terminal presents the reminder information.

The target terminal may present the reminder information in a voice broadcast or text display manner.

It should be noted that the order of the steps of the method of displaying price tag information provided by the embodiment of the present disclosure may be appropriately adjusted, and the steps may be correspondingly added or omitted as needed. Varied methods which may be easily envisaged by any person skilled in the art within the technical scope disclosed by the present disclosure should be covered by the protection scope of the present disclosure, and thus are not repeated herein.

In summary, in the method of displaying price tag information provided by the embodiment of the present disclosure, the price tag generating apparatus can determine the price tag related information including the price tag information based on the acquired image of commodity, and send the price tag related information to the target display screen to allow the target display screen to display the price tag information, so that the automatic generation and display of the price tag information can be achieved without an involvement of a worker, thereby improving the use flexibility and setting efficiency of the price tag information. In addition, in the embodiment of the present disclosure, the position of the price tag information in the display screen can be automatically determined and adjusted along with the change in position of the commodity, so that the display of the price tag information is more flexible, thereby reducing manpower investment and improving the operational efficiency of the commodity selling places such as shopping malls or supermarkets.

Figure 13:
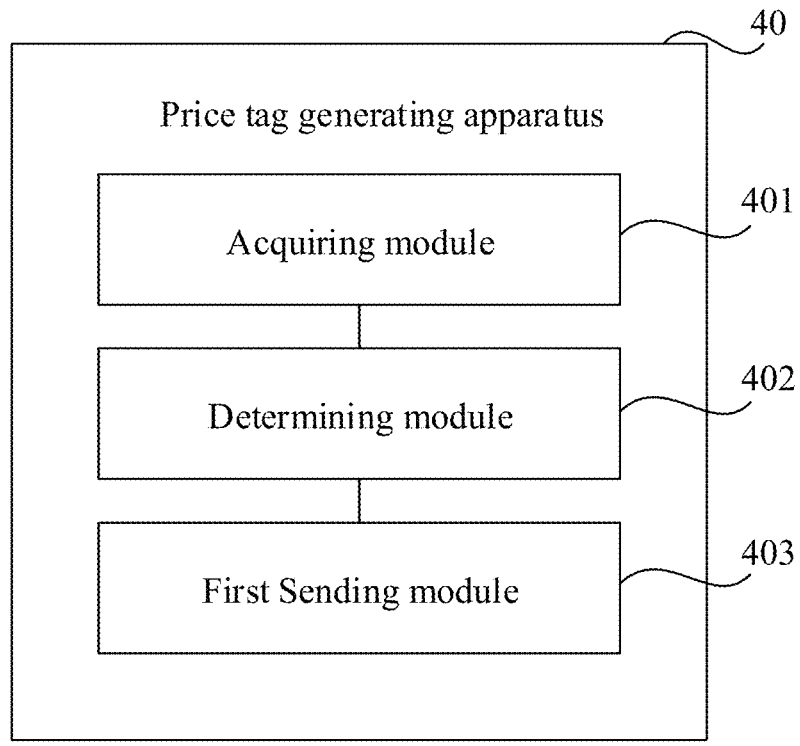
FIG. 13 is a block diagram of a price tag generating apparatus provided by an embodiment of the present disclosure.

An embodiment of the present disclosure provides a price tag generating apparatus 40. As shown in FIG. 13, a shelf system to which the price tag generating apparatus belongs further includes a shelf and at least one display screen arranged on the shelf. The price tag generating apparatus 40 includes the following modules.

An acquiring module 401 is configured to acquire an image of a commodity placed on the shelf.

A determining module 402 is configured to determine price tag related information based on the image of the commodity, wherein the price tag related information includes price tag information of the commodity placed on the shelf.

A first sending module 403 is configured to send the price tag related information to a target display screen, wherein the target display screen is a display screen for displaying the price tag information in the at least one display screen, and the price tag related information is configured to allow the target display screen to display the price tag information.

In summary, in the price tag generating apparatus provided by the embodiment of the present disclosure, the determining module may determine the price tag related information including the price tag information based on the image of the commodity acquired by the acquiring module, and the first sending module sends the price tag related information to the target display screen to allow the target display screen to display the price tag information, so that the automatic generation and display of the price tag information can be achieved without an involvement of a worker, thereby improving the use flexibility and setting efficiency of the price tag information.

Figure 14:
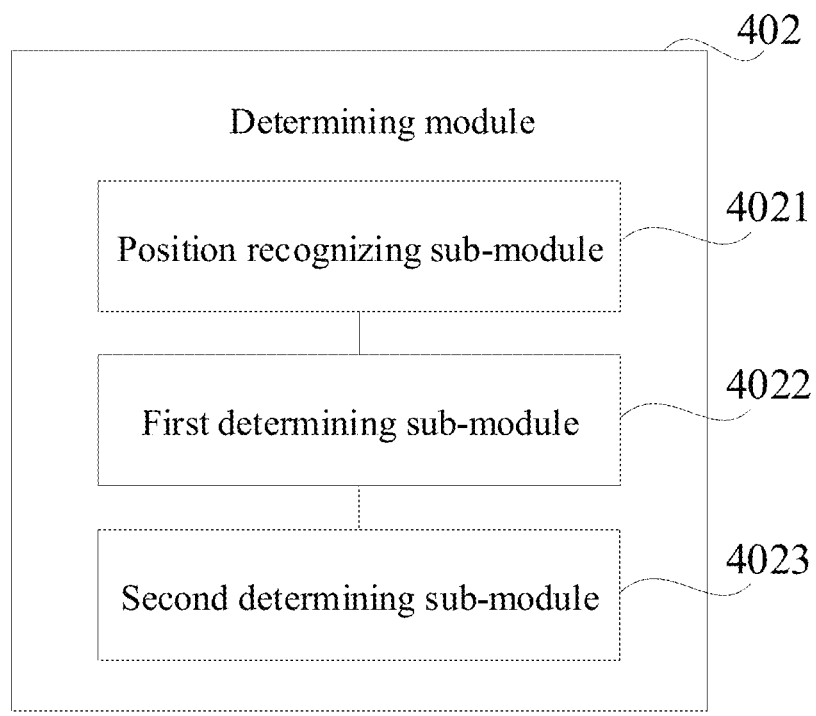
FIG. 14 is a block diagram of a determining module provided by an embodiment of the present disclosure.

Optionally, the price tag related information further includes display position information for indicating a display position of the price tag information on the target display screen. The image of the commodity further includes an image of the shelf where the commodity is placed. As shown in FIG. 14, the determining module 402 includes the following sub-modules.

A position recognizing sub-module 4021 is configured to recognize the image of the commodity to obtain a position of the commodity on the shelf.

A first determining sub-module 4022 is configured to determine the target display screen based on the position of the commodity on the shelf and a position of the at least one display screen on the shelf.

A second determining sub-module 4023 is configured to determine the display position information based on the position of the commodity on the shelf and a position of the target display screen on the shelf.

Optionally, the shelf includes a shelf body and at least one placement board. At least one display screen is arranged at a front end of each placement board. The target display screen and the commodity are arranged on the same placement board.

The second determining sub-module 4023 is configured to:

determine an overlapping range between an arrangement range of the commodity and an arrangement range of the target display screen in a length direction of the placement board where the commodity is placed based on the position of the commodity on the shelf and the position of the target display screen on the shelf; and determine the display position information, the display position information indicating a position within the overlapping range.

Optionally, a linear coordinate system is established along the length direction of the placement board where the commodity is placed. The display position information includes a length of the price tag information in the linear coordinate system, and a starting coordinate for displaying the price tag information in the linear coordinate system. The second determining sub-module 4023 is configured to:

determine the display position information based on a position calculation formula when the overlapping range is within the arrangement range of the target display screen, wherein the position calculation formula is:

$$L=X_m+(X-K)/2,$$

wherein L is the starting coordinate for displaying the price tag information in the linear coordinate system, $X_m \leq L < X_n$, $X_m$ is a starting coordinate of the overlapping range in the linear coordinate system, $X_n$ is an ending coordinate of the overlapping range in the linear coordinate system, K is the length of the price tag information in the linear coordinate system, and X is a length of the overlapping range in the linear coordinate system.

Optionally, the shelf includes a shelf body and at least one placement board, wherein at least one display screen is arranged at a front end of each placement board; and the first determining sub-module is configured to:

determine display screen(s) located on the same placement board as the commodity based on the position of the commodity on the shelf and the position of the at least one display screen on the shelf; and determine a display screen, having an intersection with the arrangement range of the commodity in the length direction of the placement board where the commodity is placed, as the target display screen, from the display screen(s) located on the same placement board as the commodity.

Figure 15:
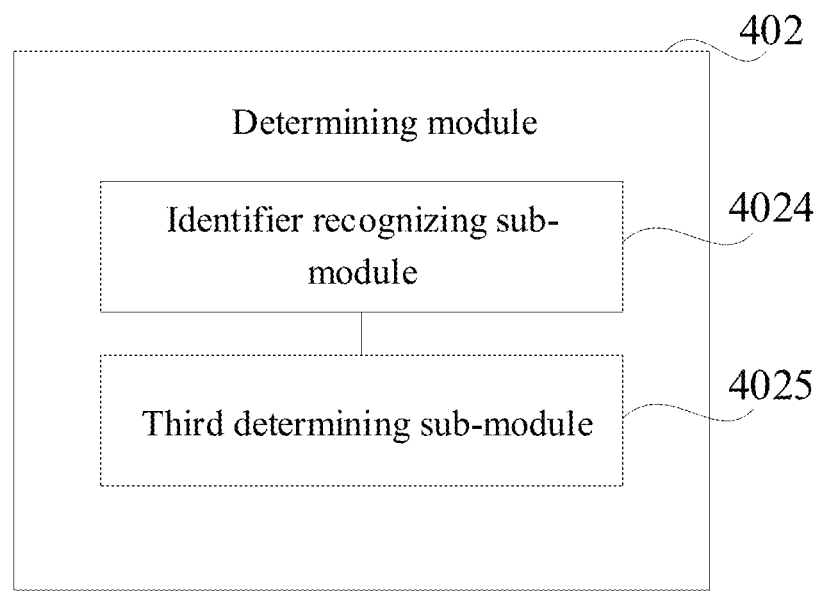
FIG. 15 is a block diagram of another determining module provided by an embodiment of the present disclosure.

Optionally, as shown in FIG. 15, the determining module 402 includes the following sub-modules.

An identifier recognizing sub-module 4024 is configured to recognize the image of the commodity to obtain an identifier of the commodity placed on the shelf.

A third determining sub-module 4025 is configured to determine the price tag information of the commodity based on the identifier of the commodity.

Optionally, the identifier recognizing sub-module 4024 is configured to:

input the image of the commodity to an image recognition model, and obtain the commodity identifier output from the image recognition model, wherein the image recognition model is configured to recognize the input image to obtain the identifier of the commodity in the image.

Figure 16:
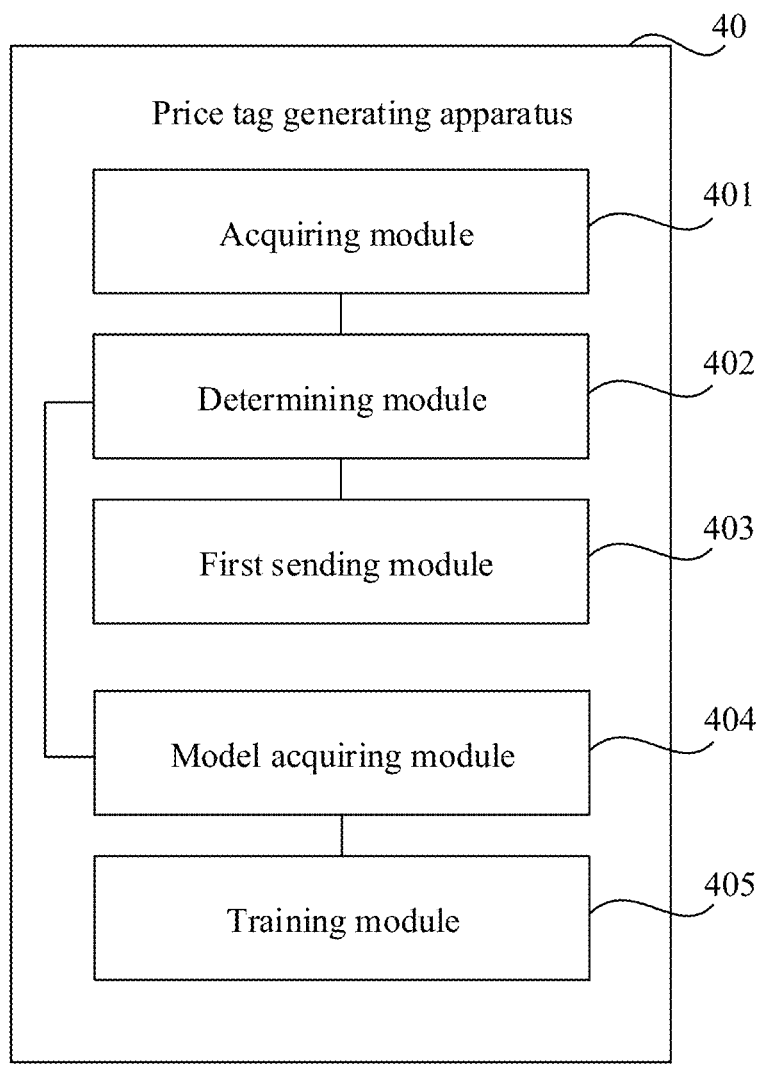
FIG. 16 is a block diagram of another price tag generating apparatus provided by an embodiment of the present disclosure.

Optionally, as shown in FIG. 16, the apparatus further includes the following modules.

A model acquiring module 404 is configured to acquire an initial image recognition model prior to the image of the commodity is input to the image recognition model.

A training module 405 is configured to train the initial image recognition model by using images of a plurality of commodities and identifiers of the plurality of commodities as training samples, to obtain the image recognition model.

Optionally, the image of the commodity includes images of the commodity captured at a plurality of directions.

Optionally, the image recognition model is an RCNN model or an SSD model.

Optionally, the determining module 402 is configured to:

query a corresponding relationship between identifiers of commodities and information of commodities based on the identifier of the commodity to obtain commodity information of the commodity; and generate the price tag information of the commodity based on the commodity information of the commodity.

Figure 17:
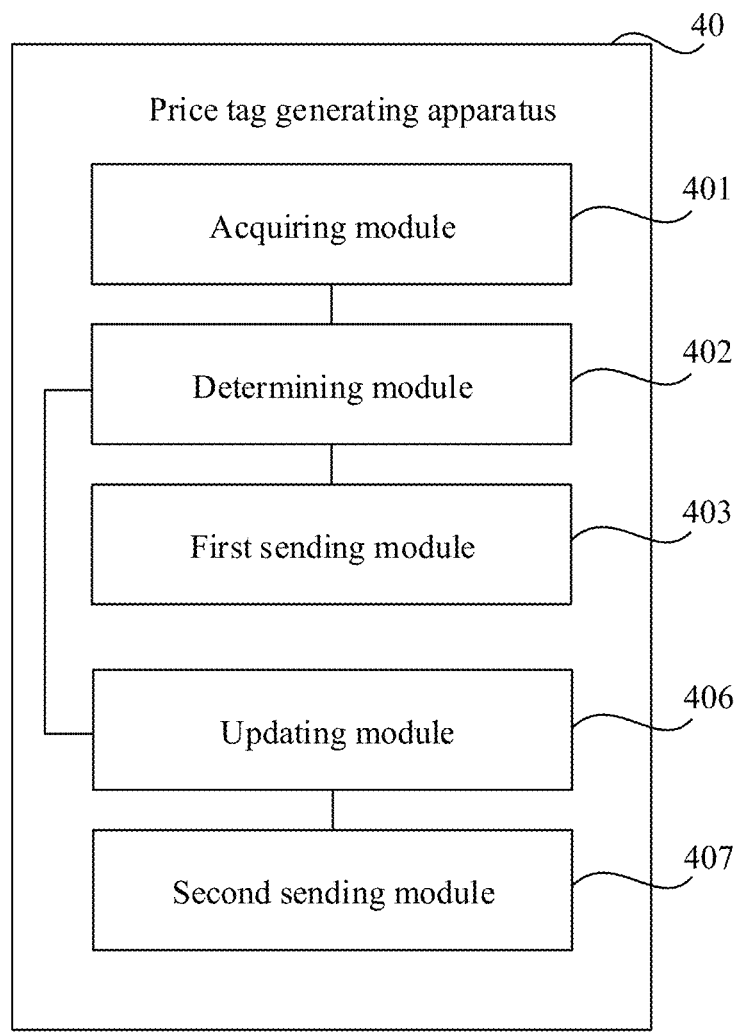
FIG. 17 is a block diagram of yet another price tag generating apparatus provided by an embodiment of the present disclosure.

Optionally, as shown in FIG. 17, the price tag generating apparatus further includes the following modules.

An updating module 406 is configured to update the price tag related information when an update condition is met.

A second sending module 407 is configured to send the updated price tag related information to the target display screen.

Optionally, the update condition includes at least one of the followings:

A price tag update instruction for updating the price tag related information is received;

a distance between a position indicated by first display position information and a position indicated by second display position information is greater than a position distance threshold, wherein the first display position information is display position information in price tag related information determined based on a re-acquired image of the commodity, and the second display position information is display position information in historical price tag related information determined at a previous time point closest to a time point of the price tag related information determined based on the re-acquired image of the commodity; or first price tag information is different from second price tag information, wherein the first price tag information is price tag information in price tag related information determined based on a re-acquired image of the commodity, and the second price tag information is price tag information in historical price tag related information determined at a previous time point closest to a time point of the price tag related information determined based on the re-acquired image of the commodity.

Figure 18:
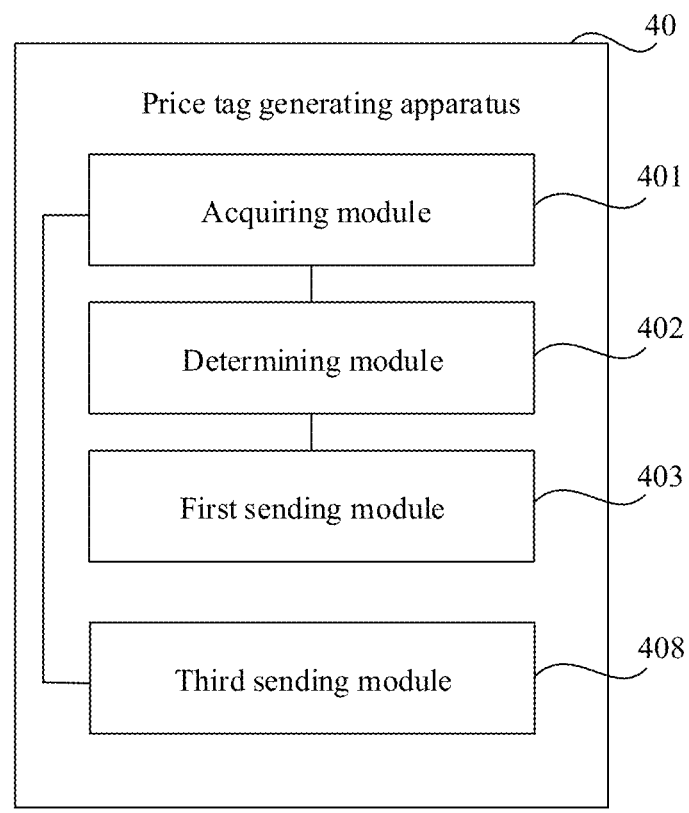
FIG. 18 is a block diagram of still another price tag generating apparatus provided by an embodiment of the present disclosure.

Optionally, as shown in FIG. 18, the price tag generating apparatus 40 further includes the following module.

A third sending module 408 is configured to send reminder information to a target terminal when the image of the commodity meets a reminder triggering condition. The reminder triggering condition includes at least one of the followings.

A certain commodity is vacant on the shelf;

a number of a certain commodity on the shelf is less than a number threshold; or a certain commodity on the shelf is placed in a wrong position.

In summary, in the price tag generating apparatus provided by the embodiment of the present disclosure, the determining module may determine the price tag related information including the price tag information based on the acquired image of the commodity, and the first sending module sends the price tag related information to the target display screen to allow the target display screen to display the price tag information, so that the automatic generation and display of the price tag information can be achieved without an involvement of a worker, thereby improving the use flexibility and setting efficiency of the price tag information.

An embodiment of the present disclosure provides a price tag generating apparatus including:

a processor; and a memory for storing instructions executable by the processor, wherein the processor can implement any method of displaying price tag information provided by the above embodiments when executing the instructions.

Figure 19:
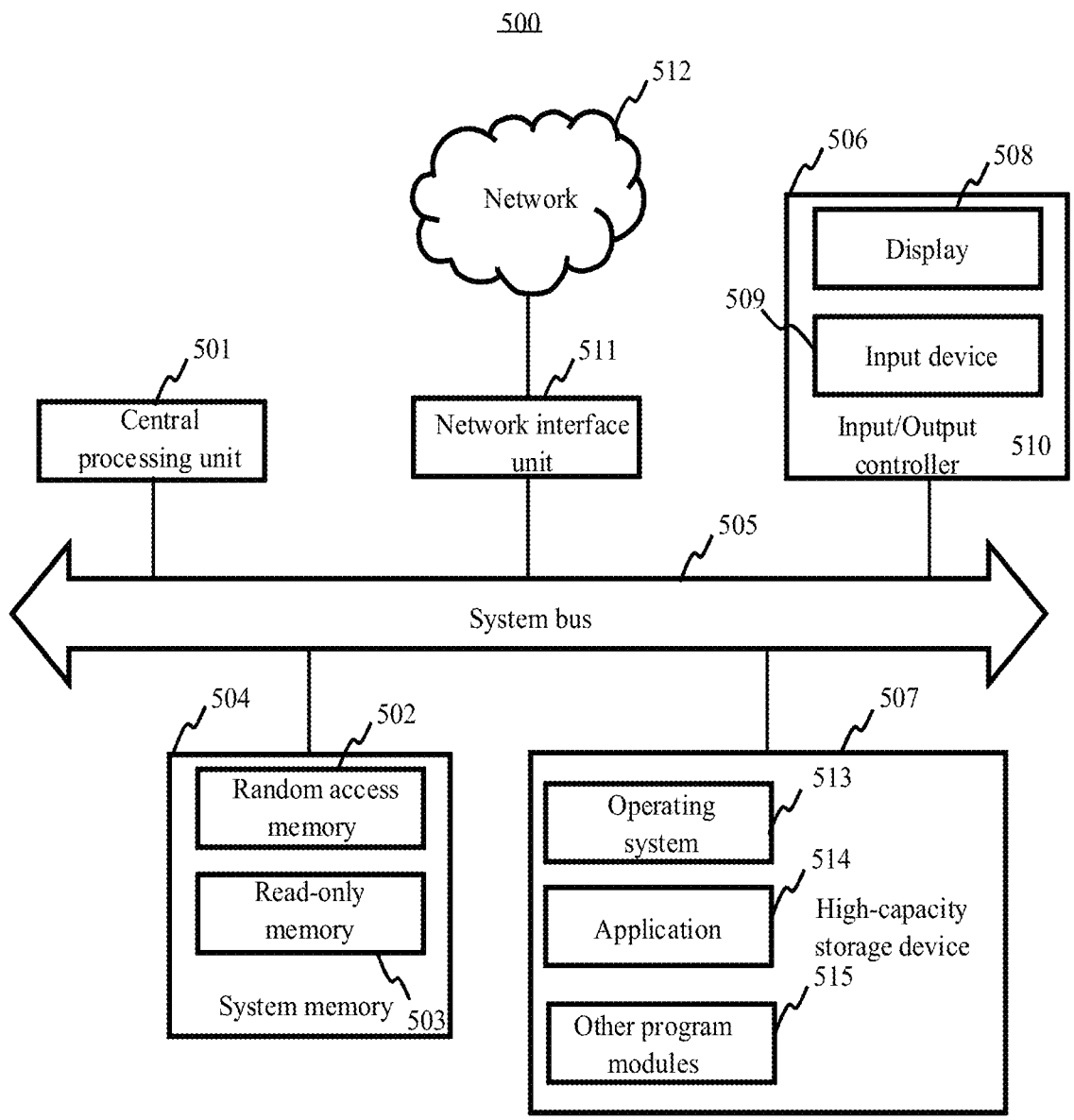
FIG. 19 is a schematic structural diagram of a price tag generating apparatus according to an exemplary embodiment.

FIG. 19 is a schematic structural diagram of a price tag generating apparatus in accordance with an exemplary embodiment. The price tag generating apparatus may be implemented as a server. The price tag generating apparatus 500 includes a central processing unit (CPU) 501, a system memory 504 including a random access memory (RAM) 502 and a read only memory (ROM) 503, and a system bus 505 connecting the system memory 504 and the CPU 501, The price tag generating apparatus 500 further includes a basic input/output system (I/O system) 506 which helps transmit information between various components within a computer, and a high-capacity storage device 507 for storing an operating system 513, an application 514 and other program modules 515.

The basic I/O system 506 includes a display 508 for displaying information and an input device 509, such as a mouse, a keyboard, or the like, for a user to input information. The display 508 and the input device 509 are both connected to the CPU 501 by an I/O controller 510 connected to the system bus 505. The basic I/O system 506 may also include the I/O controller 510 for receiving and processing input from a plurality of other devices, such as a keyboard, a mouse, an electronic stylus, or the like. Similarly, the I/O controller 510 further provides output to a display screen, a printer OF other types of output devices.

The high-capacity storage device 507 is connected to the CPU 501 by a high-capacity storage controller (not shown) connected to the system bus 505. The high-capacity storage device 507 and its associated computer-readable medium provide non-volatile storage for the price tag generating apparatus 500. That is, the high-capacity storage device 507 may include a computer-readable medium (not shown), such as a hard disk, a CD-ROM drive, or the like.

Without loss of generality, the computer-readable medium may include a computer storage medium and a communication medium. The computer storage medium includes volatile and non-volatile, removable and non-removable media implemented in any method or technology for storage of information such as a computer-readable instruction, a data structure, a program module or other data. The computer storage medium includes a RAM, a ROM, an EPROM, an EEPROM, a flash memory or other solid-state storage technologies; a CD-ROM, DVD or other optical storage; and a tape cartridge, a magnetic tape, a disk storage or other magnetic storage devices. Of course, it will be known by a person skilled in the art that the computer storage medium is not limited to above. The above system memory 504 and the high-capacity storage device 507 may be collectively referred to as a memory.

According to various embodiments of the present disclosure, the price tag generating apparatus may also be connected to a remote computer on a network through the network, such as the Internet, for operation. That is, the price tag generating apparatus 500 may be connected to the network 512 through a network interface unit 511 connected to the system bus 505, or may be connected to other types of networks or remote computer systems (not shown) through the network interface unit 511.

The memory further includes one or more programs stored in the memory. The CPU 501 implements any method of displaying price tag information provided by the above embodiments by executing the one or more programs.

An embodiment of the present disclosure provides a shelf system. A structure of the shelf system may be similar to that of the shelf systems shown in FIG. 1 and FIG. 3. The shelf system includes:

a price tag generating apparatus, a shelf, and at least one display screen arranged on the shelf. The price tag generating apparatus may be any one of the price tag generating apparatuses provided by the above embodiments of the present disclosure. For example, the price tag generating apparatus may be any one of the price tag generating apparatuses shown in FIG. 13, or FIG. 16 to FIG. 19.

Optionally, the system further includes image acquiring apparatuses. The shelf includes a shelf body and a plurality of placement boards. At least one display screen is arranged at a front end of each placement board. An image acquiring apparatus is arranged above each of the plurality of placement boards, and is configured to capture an image of the placement board below the image acquiring apparatus.

Optionally, a plurality of display screens are arranged at the front end of each of the placement boards, the display screen is a bar-shaped display screen, the image acquiring apparatus is a camera head, and a lens of each camera head faces downwards.

In summary, in the shelf system provided by the embodiment of the present disclosure, the price tag generating apparatus may determine the price tag related information including the price tag information based on the acquired image of the commodity, and send the price tag related information to the target display screen to allow the target display screen to display the price tag information, so that the automatic generation and display of the price tag information can be achieved without an involvement of a worker, thereby improving the use flexibility and setting efficiency of the price tag information. Such shelf system can be built based on a traditional intelligent shelf, and there is no need to add a lot of hardware structures, or the required hardware structures are less, so that the arrangement cost is lower.

An embodiment of the present disclosure also provides a computer-readable storage medium which may be a non-temporary computer-readable storage medium storing instructions therein. For example, the computer-readable storage medium may be a memory including instructions. When the computer-readable storage medium is run on a processing component, the processing component can be caused to perform any method of displaying price tag information provided by the above embodiments. For example, the non-temporary computer-readable storage medium may be a read only memory (ROM), a random access memory (RAM), a CD-ROM, a magnetic tape, a floppy disk, an optical data storage device, or the like.

A person skilled in the art can clearly understand that for the sake of convenience and brief description, for particular working processes of the system, apparatus and modules described above, a reference can be made to a corresponding process in the foregoing method embodiments, and the details are not repeated herein.

Other embodiments of the present disclosure will be apparent to those skilled in the art from consideration of the specification and practice of the present disclosure. The present disclosure is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure indicated by the following claims.

In the present disclosure, the terms such as "first" and "second" are merely for a descriptive purpose, and are not to be understood as indicating or implying a relative importance. The term "a plurality of" means two or more in number, unless otherwise defined.

The term "and/or" in the present disclosure merely describes the association relationship between the associated objects and indicates that there may be three relationships. For example, A and/or B may indicate three cases where only A exists, A and B exist at the same time, and only B exists. The character "/" in the present disclosure generally indicates that the relationship between the former and later associated objects is optional.

The term "at least one of A and B" in the present disclosure merely describes the association relationship between the associated objects and indicates that there may be three relationships. For example, at least one of A and B may indicate three cases where only A exists, A and B exist at the same time, or only B exists.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. A method of displaying price tag information, wherein the method is applied to a price tag generating apparatus in a shelf system, the shelf system further comprises a shelf and at least one display screen arranged on the shelf, and the method comprises:

acquiring an image of a commodity placed on the shelf;

determining price tag related information based on the image of the commodity, wherein the price tag related information comprises price tag information of the commodity placed on the shelf; and sending the price tag related information to a target display screen, wherein the target display screen is a display screen for displaying the price tag information in the at least one display screen, and the price tag related information is configured to allow the target display screen to display the price tag information; wherein the price tag related information further comprises display position information, and a linear coordinate system is established along a length direction of a placement board where the commodity is placed, the display position information comprises a length of the price tag information in the linear coordinate system, and a starting coordinate for displaying the price tag information in the linear coordinate system; and determining the price tag related information based on the image of the commodity comprises:

determining the display position information based on a position calculation formula when an overlapping range between an arrangement range of the commodity and an arrangement range of the target display screen is within the arrangement range of the target display screen, wherein the position calculation formula is:

$$L=Xm+(X-K)/2,$$

wherein L is the starting coordinate for displaying the price tag information in the linear coordinate system, $Xm \leq L < Xn$, Xm is a starting coordinate of the overlapping range in the linear coordinate system, Xn is an ending coordinate of the overlapping range in the linear coordinate system, K is the length of the price tag information in the linear coordinate system, and X is a length of the overlapping range in the linear coordinate system.

2. The method of claim 1, wherein the display position information for indicating a display position of the price tag information on the target display screen, the image of the commodity further comprises an image of a shelf where the commodity is placed, and the determining the price tag related information based on the image of the commodity comprises:

recognizing the image of the commodity to obtain a position of the commodity on the shelf;

determining the target display screen based on the position of the commodity on the shelf and a position of the at least one display screen on the shelf; and determining the display position information based on the position of the commodity on the shelf and a position of the target display screen on the shelf.

3. The method of claim 2, wherein the shelf comprises a shelf body and at least one placement board, at least one display screen is arranged at a front end of each placement board, the target display screen and the commodity are arranged on the same placement board, and the determining the display position information based on the position of the commodity on the shelf and the position of the target display screen on the shelf comprises:

determining the overlapping range between the arrangement range of the commodity and the arrangement range of the target display screen in the length direction of the placement board where the commodity is placed, based on the position of the commodity on the shelf and the position of the target display screen on the shelf; and determining the display position information, the display position information indicating a position within the overlapping range.

4. The method of claim 2, wherein the shelf comprises a shelf body and at least one placement board, at least one display screen is arranged at a front end of each placement board; and the determining the target display screen based on the position of the commodity on the shelf and the position of the at least one display screen on the shelf comprises:

determining display screens located on the same placement board as the commodity based on the position of the commodity on the shelf and the position of the at least one display screen on the shelf; and determining a display screen, having an intersection with the arrangement range of the commodity in the length direction of the placement board where the commodity is placed, as the target display screen from the display screens located on the same placement board as the commodity.

5. The method of claim 1, wherein the determining the price tag related information based on the image of the commodity comprises:

recognizing the image of the commodity to obtain an identifier of the commodity placed on the shelf; and determining the price tag information of the commodity based on the identifier of the commodity.

6. The method of claim 5, wherein the recognizing the image of the commodity to obtain the identifier of the commodity placed on the shelf comprises:

inputting the image of the commodity to an image recognition model, and obtaining the commodity identifier output from the image recognition model, the image recognition model being configured to recognize the input image to obtain the identifier of the commodity in the image.

7. The method of claim 6, wherein prior to inputting the image of the commodity to the image recognition model, the method further comprises:

acquiring an initial image recognition model; and training the initial image recognition model by using images of a plurality of commodities and identifiers of the plurality of commodities as training samples to obtain the image recognition model.

8. The method of claim 7, wherein the image of the commodity comprises images of the commodity captured at a plurality of directions.

9. The method of claim 6, wherein the image recognition model is a Region with Convolutional Neural Network feature model or a Single Shot MultiBox Detector model.

10. The method of claim 5, wherein the determining the price tag information of the commodity based on the identifier of the commodity comprises:

querying a corresponding relationship between identifiers of commodities and information of the commodities based on the identifier of the commodity to obtain commodity information of the commodity; and generating the price tag information of the commodity based on the commodity information of the commodity.

11. The method of claim 1, further comprising:

updating the price tag related information when an update condition is met; and sending the updated price tag related information to the target display screen.

12. The method of claim 11, wherein the update condition comprises at least one of the followings:

a price tag update instruction for updating the price tag related information is received;

a distance between a position indicated by first display position information and a position indicated by second display position information is greater than a position distance threshold, wherein the first display position information is display position information in price tag related information determined based on a re-acquired image of the commodity, and the second display position information is display position information in historical price tag related information determined at a previous time point closest to a time point of the price tag related information determined based on the re-acquired image of the commodity; or first price tag information is different from second price tag information, wherein the first price tag information is price tag information in price tag related information determined based on a re-acquired image of the commodity, and the second price tag information is price tag information in historical price tag related information determined at a previous time point closest to a time point of the price tag related information determined based on the re-acquired image of the commodity.

13. The method of claim 1, further comprising:

sending reminder information to a target terminal when the image of the commodity meets a reminder triggering condition, wherein the reminder triggering condition comprises at least one of the followings:

a certain commodity is vacant on the shelf;

a number of a certain commodity on the shelf is less than a number threshold; or a certain commodity on the shelf is placed in a wrong position.

14. A price tag generating apparatus, comprising:

a processor; and a memory configured to store instructions executable by the processor, wherein wherein a shelf system to which the price tag generating apparatus belongs further comprises a shelf and at least one display screen arranged on the shelf, and when executing the instructions, the processor is caused to:

acquire an image of a commodity placed on the shelf;

determine price tag related information based on the image of the commodity, wherein the price tag related information comprises price tag information of the commodity placed on the shelf; and send the price tag related information to a target display screen, wherein the target display screen is a display screen for displaying the price tag information in the at least one display screen, and the price tag related information is configured to allow the target display screen to display the price tag information; wherein the price tag related information further comprises display position information, and a linear coordinate system is established along a length direction of a placement board where the commodity is placed, the display position information comprises a length of the price tag information in the linear coordinate system, and a starting coordinate for displaying the price tag information in the linear coordinate system; and determining the price tag related information based on the image of the commodity comprises:

determining the display position information based on a position calculation formula when an overlapping range between an arrangement range of the commodity and an arrangement range of the target display screen is within the arrangement range of the target display screen, wherein the position calculation formula is:

$L=Xm+(X-K)/2,$ wherein L is the starting coordinate for displaying the price tag information in the linear coordinate system, $Xm \leq L < Xn$, Xm is a starting coordinate of the overlapping range in the linear coordinate system, Xn is an ending coordinate of the overlapping range in the linear coordinate system, K is the length of the price tag information in the linear coordinate system, and X is a length of the overlapping range in the linear coordinate system.

15. A shelf system, comprising:
a price tag generating apparatus, a shelf and at least one display screen arranged on the shelf, wherein the price tag generating apparatus comprises the price tag generating apparatus of claim 14.

16. The system of claim 15, further comprising: image acquiring apparatuses, wherein
the shelf comprises a shelf body and a plurality of placement boards, a plurality of display screens are arranged at a front end of each of the placement boards, the display screen is a bar-shaped display screen, and an image acquiring apparatus is arranged above each of the plurality of placement boards, and is configured to capture an image of the placement board below the image acquiring apparatus.

17. A non-transitory computer-readable storage medium, wherein instructions are stored in the computer-readable storage medium, and when the readable storage medium runs on a processing component, the processing component is caused to execute the method of displaying price tag information of claim 1.

18. The apparatus of claim 14, wherein the display position information for indicating a display position of the price tag information on the target display screen, the image of the commodity further comprises an image of a shelf where the commodity is placed, and
the determining the price tag related information based on the image of the commodity comprises:
recognizing the image of the commodity to obtain a position of the commodity on the shelf;
determining the target display screen based on the position of the commodity on the shelf and a position of the at least one display screen on the shelf; and
determining the display position information based on the position of the commodity on the shelf and a position of the target display screen on the shelf.

19. The apparatus of claim 18, wherein the shelf comprises a shelf body and at least one placement board, at least one display screen is arranged at a front end of each placement board, the target display screen and the commodity are arranged on the same placement board, and
the determining the display position information based on the position of the commodity on the shelf and the position of the target display screen on the shelf comprises:
determining the overlapping range between the arrangement range of the commodity and the arrangement range of the target display screen in the length direction of the placement board where the commodity is placed, based on the position of the commodity on the shelf and the position of the target display screen on the shelf; and
determining the display position information, the display position information indicating a position within the overlapping range.

* * * * *